(12) United States Patent
Kadohata et al.

(10) Patent No.: US 10,587,472 B2
(45) Date of Patent: Mar. 10, 2020

(54) HIGHLY RELIABLE PATH ACCOMMODATION DESIGN APPARATUS AND METHOD

(71) Applicant: NIPPON TELEGRAPH AND TELEPHONE CORPORATION, Tokyo (JP)

(72) Inventors: Akihiro Kadohata, Yokosuka (JP); Akira Hirano, Yokosuka (JP); Atsushi Watanabe, Yokosuka (JP); Fumikazu Inuzuka, Yokosuka (JP); Takafumi Tanaka, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/704,443

(22) Filed: Sep. 14, 2017

(65) Prior Publication Data
US 2018/0006889 A1    Jan. 4, 2018

Related U.S. Application Data

(62) Division of application No. 14/759,607, filed as application No. PCT/JP2014/052252 on Jan. 31, 2014, now Pat. No. 9,794,123.

(30) Foreign Application Priority Data

Feb. 1, 2013   (JP) ................. 2013-018621

(51) Int. Cl.
*H04L 12/24*    (2006.01)
*H04J 14/02*    (2006.01)
(Continued)

(52) U.S. Cl.
CPC .......... *H04L 41/0836* (2013.01); *H04J 14/02* (2013.01); *H04J 14/0227* (2013.01);
(Continued)

(58) Field of Classification Search
CPC ............... H04J 14/0227; H04J 14/0283; H04J 14/0284; H04J 14/02; H04J 14/0293;
(Continued)

(56) References Cited

U.S. PATENT DOCUMENTS

| 6,256,295 B1 * | 7/2001 | Callon ................ H04L 49/3081 370/254 |
| 7,209,975 B1 | 4/2007 | Zang |

(Continued)

FOREIGN PATENT DOCUMENTS

| JP | 2002-300195 A | 10/2002 |
| JP | 2003-258862 A | 9/2003 |

(Continued)

OTHER PUBLICATIONS

W. Yao, G. Sahin, M. Li, and B. Ramamurthy, "Analysis of multi-hop traffic grooming in WDM mesh networks", Broadband networks 2005, pp. 177-186, Oct. 2005.
(Continued)

*Primary Examiner* — Harun Chowdhury
(74) *Attorney, Agent, or Firm* — Harness, Dickey & Pierce, P.L.C.

(57) ABSTRACT

Accommodation design for wavelength and sub-λ paths in a communication network is performed. If sub-λ path accommodation is possible according to search for a wavelength path present in a single-hop logical route, the accommodation in the wavelength path is executed. If sub-λ path accommodation is possible according to search for a wavelength path present in a multi-hop logical route, a logical route is selected based on the wavelength path and the sub-λ path is accommodated in the wavelength path. Additionally, each physical route suitable for the sub-λ path accommodation is searched for. If the route can accommodate a wavelength path set in a single-hop logical route by avail- (Continued)

able wavelength allocation, the sub-λ path is accommodated in the wavelength path. Furthermore, routes in consideration of overlapping of nodes, pipelines, and links and operation rate are selected based on information about the start and end nodes of each of redundant routes.

2 Claims, 17 Drawing Sheets

(51) Int. Cl.
*H04L 12/939* (2013.01)
*H04L 12/703* (2013.01)
*H04L 12/721* (2013.01)
*H04L 12/733* (2013.01)

(52) U.S. Cl.
CPC ........ *H04J 14/0293* (2013.01); *H04L 45/122* (2013.01); *H04L 45/28* (2013.01); *H04L 45/62* (2013.01); *H04L 49/552* (2013.01)

(58) Field of Classification Search
CPC ......... H04L 45/00; H04L 45/22; H04L 45/28; H04L 45/62; H04L 41/0836; H04L 49/552
USPC ................ 370/216, 225, 238, 255, 217, 254
See application file for complete search history.

(56) References Cited

U.S. PATENT DOCUMENTS

| | | | |
|---|---|---|---|
| 2003/0156536 A1 | 8/2003 | Oki et al. | |
| 2003/0229807 A1 | 12/2003 | Qiao | |
| 2005/0071484 A1* | 3/2005 | Kang | ................ H04J 14/0227 709/230 |
| 2005/0237950 A1* | 10/2005 | Yuan | ................ H04J 14/0227 370/255 |

FOREIGN PATENT DOCUMENTS

| | | |
|---|---|---|
| JP | 2007-274249 A | 10/2007 |
| JP | 2009-212897 A | 9/2009 |
| JP | 2009/232321 A | 10/2009 |

OTHER PUBLICATIONS

Ramesh Bhandari, "Survivable Networks—Algorithms for Diverse Routing", Kluwer Academic Publishers, Chapter 7, pp. 176-182, 1999.
J. Silva, T. Gomes, L. Fernandes, C. Simoes, and J. Craveirinha, "An heuristic for maximally SRLG-disjoint path pairs calculation", Ultra Modern Telecommunications and Control Systems and Workshops (ICUMT) 2011, pp. 1-8, 2011.
Ramesh Bhandari, "Survivable Networks—Algorithms for Diverse Routing", Kluwer Academic Publishers, Chapter 8, pp. 186-188, 1999.
"ITU-T Recommendation, G.709/Y.1331", 2009.
"ITU-T Recommendation, G.707/Y.1322", 2007.
S. Bryant et al., "IETF Network working group, RFC. 5317", Joint Working Team (JWT) Report on MPLS Architectural Considerations for a Transport Profile, 2009, pp. 1 to 68.
H. Zang, J. Jue, and B. Mukherjee, "A review of routing and wavelength assignment approaches for wavelength-routed optical WDM networks," Opt. Netw. Mag., vol. 1, No. 1, pp. 47-60, Jan. 2000.
Lei Guo et al., Multicast Waveband Routing and Grooming Algorithm in Optical WDM Networks, Computer Engineering and Technology (ICCET), 2010 2nd International Conference on, vol. 2, Apr. 16, 2010, V2-610-V2-614.
Osamu Ishida et al., Highly Efficient Photonic Networking Technology, NTT Technical Review, vol. 9 No. 8, Aug. 2011, p. 1-6.
A. Kadohata et al., Multi-Layer Greefield Re-Grooming with Wavelength Defragmentation, IEEE Commun. Lett., vol. 16, No. 4, 2012, p. 530-532.
International Search Report for PCT/JP2014/052252, ISA/JP, dated Apr. 1, 2014 with English translation thereof.
Office Action for JP 2013-018622, dated Dec. 2, 2014, with English translation thereof.
Written Opinion of the International Preliminary Examining Authority for PCT/JP2014/052252, IPEA/JP, dated Jan. 27, 2015, with English translation thereof.
Notice of Allowance, Japanese Patent Application No. 2014-559773, dated Jan. 12, 2016.

\* cited by examiner (DEGENERATION METHOD 1)
OPERATION RATE COMPUTATION IS NOT AFFECTED
BY DISREGARDING NODE/LINK ALONG WHICH NO PATH PASSES (DEGENERATION METHOD 2)
WHEN STATE OF COMMUNICATION ROOTE IS CONSTANT BEFORE AND AFTER FAULT,
RELEVANT ROUTES BEFORE AND AFTER FAULT CAN BE REGARDED AS SAME ELEMENT EXAMPLE: ONE STANDBY PATH FOR TWO CURRENT PATHS
ONLY LINK OPERATION RATE IS CONSIDERED
DISREGARD SIMULTANEOUS FAULT AT TWO OR MORE LINKS

TRUTH TABLE

|   | A-B | B-C | C-D | A-D | B-D | CONNECTION |
|---|-----|-----|-----|-----|-----|------------|
| 1 | ○ | ○ | ○ | ○ | ○ | OK |
| 2 | ○ | ○ | ○ | ○ | × | OK |
| 3 | ○ | ○ | ○ | × | ○ | OK |
| 4 | ○ | ○ | × | ○ | ○ | NG |
| 5 | ○ | × | ○ | ○ | ○ | OK |
| 6 | × | ○ | ○ | ○ | ○ | NG |

HIGHLY RELIABLE PATH ACCOMMODATION DESIGN APPARATUS AND METHOD

CROSS REFERENCE TO RELATED APPLICATIONS

This application is a division of U.S. application Ser. No. 14/759,607 filed Jul. 7, 2015 which is a 371 U.S. National Stage of International Application No. PCT/JP2014/052252 filed on Jan. 31, 2014 which claims the benefit of and priority to Japanese Patent Application No. 2013-018621 filed on Feb. 1, 2013. The disclosures of the above applications are incorporated herein by reference.

TECHNICAL FIELD

The present invention relates to a path accommodation design apparatus, a path accommodation design method, and a path accommodation design program, which are utilized to design sub-λ path and wavelength path accommodation.

Priority is claimed on Japanese Patent Application No. 2013-018621, filed Feb. 1, 2013, the contents of which are incorporated herein by reference.

BACKGROUND ART

In recent years, pseudodynamic traffic having a large size has increased, such as an increase in communication via a data center accompanied with progress in LTE-A or cloud computing. In order to highly efficiently accommodate such traffic, integrated accommodation of sub-λ (electrical) path and wavelength path is required.

More specifically, in order to improve the accommodation efficiency of traffic (e.g., sub-λ paths or electrical paths which are communication paths that can be electrically processed) in a wavelength path, grooming (to bundle a plurality of paths or traffic elements) should be performed at a relay node and the node at which the grooming is performed needs to be changed depending on the amount of traffic. In this process, wavelength continuity constraint, in which a single wavelength needs to be allocated to a range from a start node to a relay node or an end node, must be considered.

A known method of grooming sub-λ paths by means of a multi-hop logical route has been proposed so as to reduce traffic blocking (see, for example, Non-Patent Document 1).

In a fixed-order multi-hop (FOMH) grooming algorithm disclosed in Non-Patent Document 1, the number of logical hops is not considered. Additionally, when a physical route is designed, it is important to produce a balanced route in consideration of the use state of wavelengths so as to reduce the need for further extension of traffic.

In addition, as a method of designing redundant routes utilized to implement a highly reliable network, a k-vertex-disjoint algorithm to compute k path routes (k is a natural number) having no node overlapping is known (see, for example, Non-Patent Document 2).

Furthermore, as an algorithm utilized to prevent any link having pipeline overlapping, a shared risk link group (SRLG) disjoint path algorithm is known (see, for example, Non-Patent Document 3).

Additionally, in each sub-network produced by dividing a network into sub-networks, the start points or the end points of redundant routes may not coincide with each other. A two sources, two destinations-fixed source/destination pairs algorithm is known (see, for example, Non-Patent Document 4).

However, when redundant routes in a sub-network (NW) produced by dividing a network into sub-networks are designed utilizing any conventional redundant route design method, it is impossible to avoid both pipeline overlapping and overlapping of nodes and links as much as possible. In addition, for a multilayer including sub-λ and wavelength paths, no method of designing highly reliable redundant routes having a high accommodation efficiency is known.

PRIOR ART DOCUMENT

Non-Patent Document

Non-Patent Document 1: W. Yao, G. Sahin, M. Li, and B. Ramamurthy, "Analysis of multi-hop traffic grooming in WDM mesh networks", Broadband networks 2005, pp. 177-186, October 2005.

Non-Patent Document 2: Ramesh Bhandari, "Survivable Networks—Algorithms for Diverse Routing", KLUWER ACADEMIC PUBLISHERS, Chapter 7, pp 176-182, 1999.

Non-Patent Document 3: J. Silva, T. Gomes, L. Fernandes, C. Simoes, and J. Craveirinha, "An heuristic for maximally SRLG-disjoint path pairs calculation", Ultra Modern Telecommunications and Control Systems and Workshops (ICUMT) 2011, pp. 1-8, 2011.

Non-Patent Document 4: Ramesh Bhandari, "Survivable Networks—Algorithms for Diverse Routing", KLUWER ACADEMIC PUBLISHERS, Chapter 8, pp 186-188, 1999.

DISCLOSURE OF INVENTION

Problem to be Solved by the Invention

As shown in FIG. 14, in conventional path accommodation design methods, any one of wavelength paths can be selected and the number of hops in each logical route is not considered, and as shown in FIG. 15, the physical route arrangement is uneven.

In addition, when redundant routes in a sub-network (NW) produced by dividing a network into sub-networks are designed, if a current route and a spare route have different start nodes (and/or end nodes), it is necessary to design a plurality of routes by which both pipeline overlapping and overlapping of nodes and links are avoided as much as possible.

FIG. 16 is a diagram utilized to explain a route design process for a case in which the entire network is divided into four sub-networks (NWs).

In this case, a zero-system route (represented by dashed arrows) from the start point in the first sub-network to the end point in the fourth sub-network and a one-system route (represented by solid arrows) as a redundant route are designed. As shown in FIG. 16, fibers of a route indicated by an X mark and a one-system route in parallel thereto are accommodated in a single pipeline. The route design must be performed by selecting a physical section while avoiding such pipeline overlapping.

However, in conventional redundant route design method, when redundant routes in a sub-network (NW) produced by dividing a network into sub-networks are designed, it is impossible to avoid both pipeline overlapping and overlapping o nodes and links as much as possible.

In light of the above circumstances, an object of the present invention is to provide a path accommodation design apparatus, a path accommodation design method, and a path accommodation design program, by which a (single-hop or multi-hop) logical route having no uneven physical route arrangement can be designed, where overlapping between nodes, links, or pipelines is avoided as much as possible.

Means for Solving the Problem

In order to solve the above-described problem, the present invention provides, as a first mode, a path accommodation design apparatus that performs accommodation design for a wavelength path and a sub-λ path in a communication network, the apparatus comprising:

a first sub-λ path accommodation device that determines whether or not accommodation of the sub-λ path is possible based on a result of search for a first wavelength path which is present in a single-hop logical route, where if the accommodation of the sub-λ path is possible, the first sub-λ path accommodation device makes the first wavelength path accommodate the sub-λ path;

a second sub-λ path accommodation device that determines whether or not accommodation of the sub-λ path is possible based on a result of search for a second wavelength path which is present in a multi-hop logical route, where for a plurality of accommodable logical routes, the second sub-λ path accommodation device selects a logical route and a physical route based on the number of hops for the logic route, the number of hops for the physical route, and a wavelength use rate and makes the second wavelength path accommodate the sub-λ path;

a third sub-λ path accommodation device that searches for each physical route as a candidate for the accommodation of the sub-λ path; selects a candidate route based on a wavelength use rate from among each physical route obtained by the search; and determines whether or not accommodation of a third wavelength path in the selected candidate route is possible, where the third wavelength path is set in a single-hop logical route by allocation of an available wavelength, and if the accommodation of the third wavelength path is possible, the third sub-λ path accommodation device makes the third wavelength path accommodate the sub-λ path; and a design device that performs a control to make any one of the first sub-λ path accommodation device, the second sub-λ path accommodation device, and the third sub-λ path accommodation device execute the accommodation of the sub-λ path.

The present invention also provides, as a second mode, a path accommodation design apparatus that performs accommodation design for a wavelength path and a sub-λ path in a communication network, the apparatus comprising:

a first sub-λ path accommodation device that determines whether or not accommodation of the sub-λ path is possible based on a result of search for a first wavelength path which is present in a single-hop logical route, where if the accommodation of the sub-λ path is possible, the first sub-λ path accommodation device makes the first wavelength path accommodate the sub-λ path;

a second sub-λ path accommodation device that determines whether or not accommodation of the sub-λ path is possible based on a result of search for a second wavelength path which is present in a multi-hop logical route, where for a plurality of accommodable logical routes, the second sub-λ path accommodation device selects a logical route and a physical route based on the number of hops for the logic route, the number of hops for the physical route, and a wavelength use rate and makes the second wavelength path accommodate the sub-λ path;

a third sub-λ path accommodation device that searches for a physical route for the accommodation of the sub-λ path and determines whether or not there is a grooming node on the physical route obtained by the search, where if there is the grooming node, the third sub-λ path accommodation device makes a third wavelength path, which is formed utilizing the physical route, accommodate the sub-λ path; and a design device that performs a control to make any one of the first sub-λ path accommodation device, the second sub-λ path accommodation device, and the third sub-λ path accommodation device execute the accommodation of the sub-λ path.

A typical example of the first mode further comprises a fourth sub-λ path accommodation device that extracts an existing wavelength path having a free band wider than or equal to the request bandwidth and determines whether or not accommodation of the sub-λ path in the extracted existing wavelength path and a fourth wavelength path to which an available wavelength is allocated is possible, where if the accommodation is possible, the fourth sub-λ path accommodation device selects a logical route based on the fourth wavelength path and makes the fourth wavelength path accommodate the sub-λ path.

The present invention also provides, as a third mode, a path accommodation design apparatus that designs a plurality of redundant routes in a communication network, the apparatus comprising:

a communication network information storage device that stores communication network information which indicates configuration of a communication network;

a candidate route computation device that refers to the communication network information stored in the communication network information storage device and computes, based on information about start and end nodes of each of redundant routes whose setting is requested, physical routes as candidate routes for all or a number of communication routes, said number being designated in advance; and a communication route output device that outputs redundant communication route information which is information about the candidate routes where each candidate route having any one of fiber overlapping such that a single fiber is included in a plurality of routes, node overlapping such that a single node is included in a plurality of routes, and pipeline overlapping a single pipeline is included in a plurality of routes is deleted.

In a preferable example of the third mode, the candidate route computation device computes a first route by utilizing a computation method that computes the physical routes based on a permissible number of overlapped items and/or an operation rate for at least one item of fiber, node, and pipeline;

the path accommodation design apparatus further comprises a device that computes a second route by utilizing the computation method after the first route is computed; and among a plurality of combinations of the first and second routes, any combination that does not satisfy required quality is deleted.

A preferable example of the first mode further comprises:

a device that computes candidates for the logical route;

a device that searches the computed candidates for possible combinations between the logical routes corresponding to a target number of redundant paths; and a device that performs physical route design with respect to the combinations of the logical routes as candidates, which were obtained by the above search.

Another preferable example of the first mode further comprises:

a device that computes candidates for the logical route;

a device that searches the computed candidates for possible combinations between the logical routes corresponding to a target number of redundant paths; and a device that computes an operation rate with respect to each combination obtained by the above search;

a device that performs physical route design with respect to a logical route selected based on the operation rate; and a device that computes an operation rate with respect to each candidate for the physical route, which was obtained by the physical route design.

The present invention also provides a path accommodation design method that performs accommodation design for a wavelength path and a sub-λ path in a communication network, the method comprising:

a first sub-λ path accommodation step that determines whether or not accommodation of the sub-λ path is possible based on a result of search for a first wavelength path which is present in a single-hop logical route, where if the accommodation of the sub-λ path is possible, the first sub-λ path accommodation step makes the first wavelength path accommodate the sub-λ path;

a second sub-λ path accommodation step that determines whether or not accommodation of the sub-λ path is possible based on a result of search for a second wavelength path which is present in a multi-hop logical route, where for a plurality of accommodable logical routes, the second sub-λ path accommodation step selects a logical route and a physical route based on the number of hops for the logic route, the number of hops for the physical route, and a wavelength use rate and makes the second wavelength path accommodate the sub-λ path;

a third sub-λ path accommodation step that searches for each physical route as a candidate for the accommodation of the sub-λ path; selects a candidate route based on a wavelength use rate from among each physical route obtained by the search; and determines whether or not accommodation of a third wavelength path in the selected candidate route is possible, where the third wavelength path is set in a single-hop logical route by allocation of an available wavelength, and if the accommodation of the third wavelength path is possible, the third sub-λ path accommodation step makes the third wavelength path accommodate the sub-λ path; and a design step that performs a control to make any one of the first sub-λ path accommodation step, the second sub-λ path accommodation step, and the third sub-λ path accommodation step execute the accommodation of the sub-λ path.

In a typical example, the path accommodation design method further comprises:

a step that extracts an existing wavelength path having a free band wider than or equal to the request bandwidth;

a step that determines whether or not accommodation of the sub-λ path in the extracted existing wavelength path and a fourth wavelength path to which an available wavelength is newly allocated is possible; and a step that selects, if the accommodation is possible, a logical route based on the fourth wavelength path and makes the fourth wavelength path accommodate the sub-λ path.

In another typical example, the path accommodation design method further comprises:

a candidate route computation step that refers to stored communication network information and computes physical routes as candidate routes for all or a number of communication routes, said number being designated in advance; and a communication route output step that outputs redundant communication route information which is information about the candidate routes where each candidate route having any one of fiber overlapping such that a single fiber is included in a plurality of routes, node overlapping such that a single node is included in a plurality of routes, and pipeline overlapping a single pipeline is included in a plurality of routes is deleted.

A preferable example of the path accommodation design method further comprises:

a step that computes a first route by utilizing a computation method that computes routes based on a permissible number of overlapped items and/or an operation rate for at least one item of fiber, node, and pipeline; and a step that computes a second route by utilizing the computation method after the first route is computed, wherein among a plurality of combinations of the first and second routes, any combination that does not satisfy required quality is deleted.

Another preferable example of the path accommodation design method further comprises:

a step that computes candidates for the logical route;

a step that searches the computed candidates for possible combinations between the logical routes corresponding to a target number of redundant paths; and a step that computes an operation rate with respect to each combination obtained by the above search;

a step that performs physical route design with respect to a logical route selected based on the operation rate; and a step that computes an operation rate with respect to each candidate for the physical route, which was obtained by the physical route design.

Effect of the Invention

According to the present invention, path accommodation design which produces no uneven route arrangement can be performed, traffic accommodation efficiency can be improved, and highly reliable redundant routes can be designed.

MODE FOR CARRYING OUT THE INVENTION

First Embodiment

Below, a path accommodation design apparatus according to a first embodiment of the present invention will be explained with reference to the drawings.

First, terms employed in the present specification will be explained.

A "sub-$\lambda$ path or electrical path" denotes a communication path which can be electrically processed by, for example:
(i) an optical channel data unit (ODU) described in a document "ITU-T Recommendation, G.709/Y.1331";
(ii) a synchronous digital hierarchy (SDH) described in a document "ITU-T Recommendation, G.707/Y.1322"; or
(iii) a multiprotocol label switching transport profile (MPLS-TP) described in a document "IETF Network working group, RFC. 5317".

Next, "grooming" means to bundle a plurality of paths or traffic elements. A "logical route" is a logical route along which a sub-$\lambda$ path passes. A "physical route" is a physical route along which a wavelength path passes.

A "single-hop logical route" means a sub-$\lambda$ path route in which no electrical processing is performed at each relay node between the start and ends nodes.

A "multi-hop logical route" means a sub-$\lambda$ path route in which electrical processing is performed at least one relay node between the start and ends nodes.

Figure 1A:
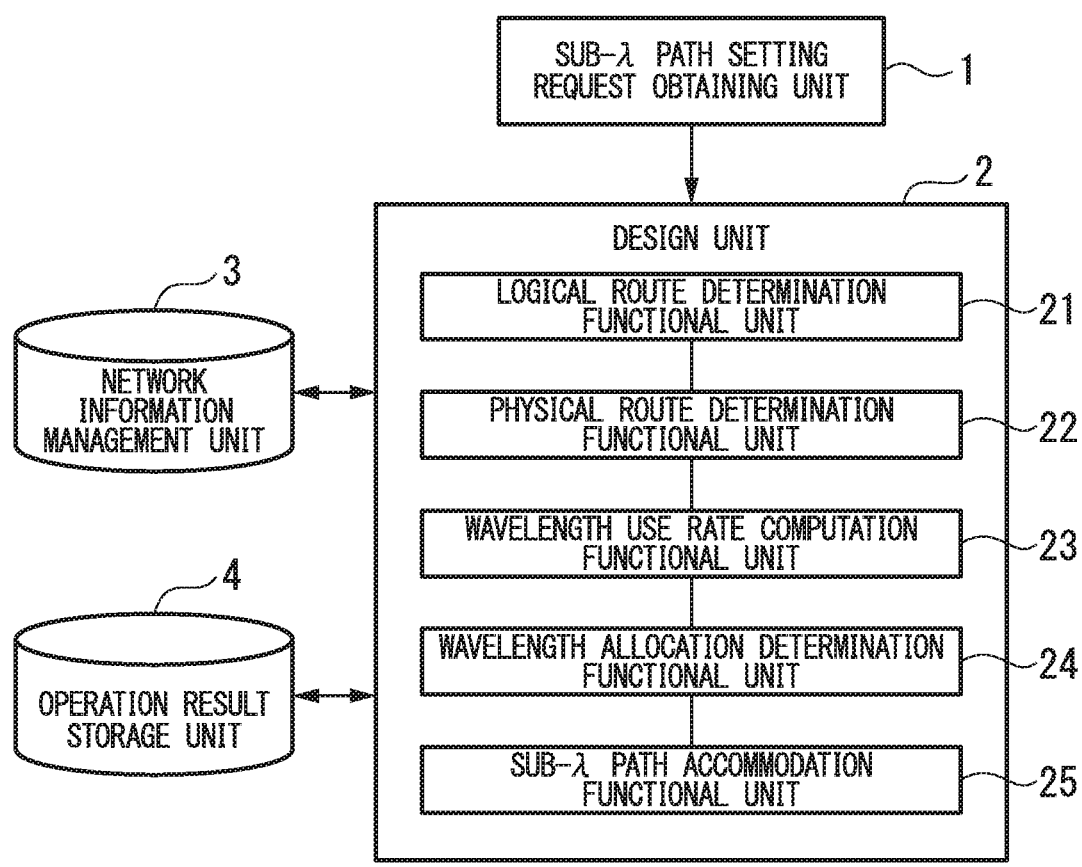
FIG. 1A is a block diagram that shows the configuration of a first embodiment according to the present invention.

FIG. 1A is a block diagram that shows the configuration of the first embodiment. The path accommodation design apparatus as shown in FIG. 1A includes a sub-$\lambda$ path setting request obtaining unit 1, a design unit 2, a network information management unit 3, and an operation result storage unit 4.

The design unit 2 has a logical route determination functional unit 21, a physical route determination functional unit 22, a wavelength use rate computation functional unit 23, a wavelength allocation determination functional unit 24, and a sub-$\lambda$ path accommodation functional unit 25.

The sub-$\lambda$ path setting request obtaining unit 1 obtains information that includes information items about (i) each pair of start and end nodes for which relevant setting has been requested and (ii) a setting range for the sub-$\lambda$ path.

The design unit 2 controls the processing operation by supervising the logical route determination functional unit 21, the physical route determination functional unit 22, the wavelength use rate computation functional unit 23, the wavelength allocation determination functional unit 24, and the sub-$\lambda$ path accommodation functional unit 25.

The logical route determination functional unit 21 performs a logical route operation in a logical layer.

The physical route determination functional unit 22 performs a physical route operation in a wavelength layer.

The algorithm utilized in the route operation may be a Dijkstra's algorithm which computes the shortest route, a breadth-first search algorithm that makes total route search possible, or a k-shortest path algorithm which computes k routes.

In the wavelength allocation, the wavelength allocation determination functional unit 24 may employ a First-Fit method (see a document: H. Zang, J. Jue, and B. Mukherjee, "A review of routing and wavelength assignment approaches for wavelength-routed optical WDM networks," Opt. Netw. Mag., Vol. 1, no. 1, pp. 47-60, January 2000") in which each wavelength to be allocated is selected from among selectable wavelengths in order of the wavelength number from the smallest to the largest (i.e., the order of wavelength from the shortest to the longest).

The network information management unit 3 stores physical topology information, information about each wavelength path route and wavelength allocation, information about each used band due to sub-$\lambda$ path accommodation in each wavelength path, and information about each sub-$\lambda$ path logical route and a wavelength path which accommodates the sub-$\lambda$ path.

The operation result storage unit 4 is a storage medium such as a hard disk or a memory and stores information about the progress of the operation executed by the design unit 2 and a final result of the relevant operation.

Next, the operation of the path accommodation design apparatus shown in FIG. 1A will be explained.

Figure 2:
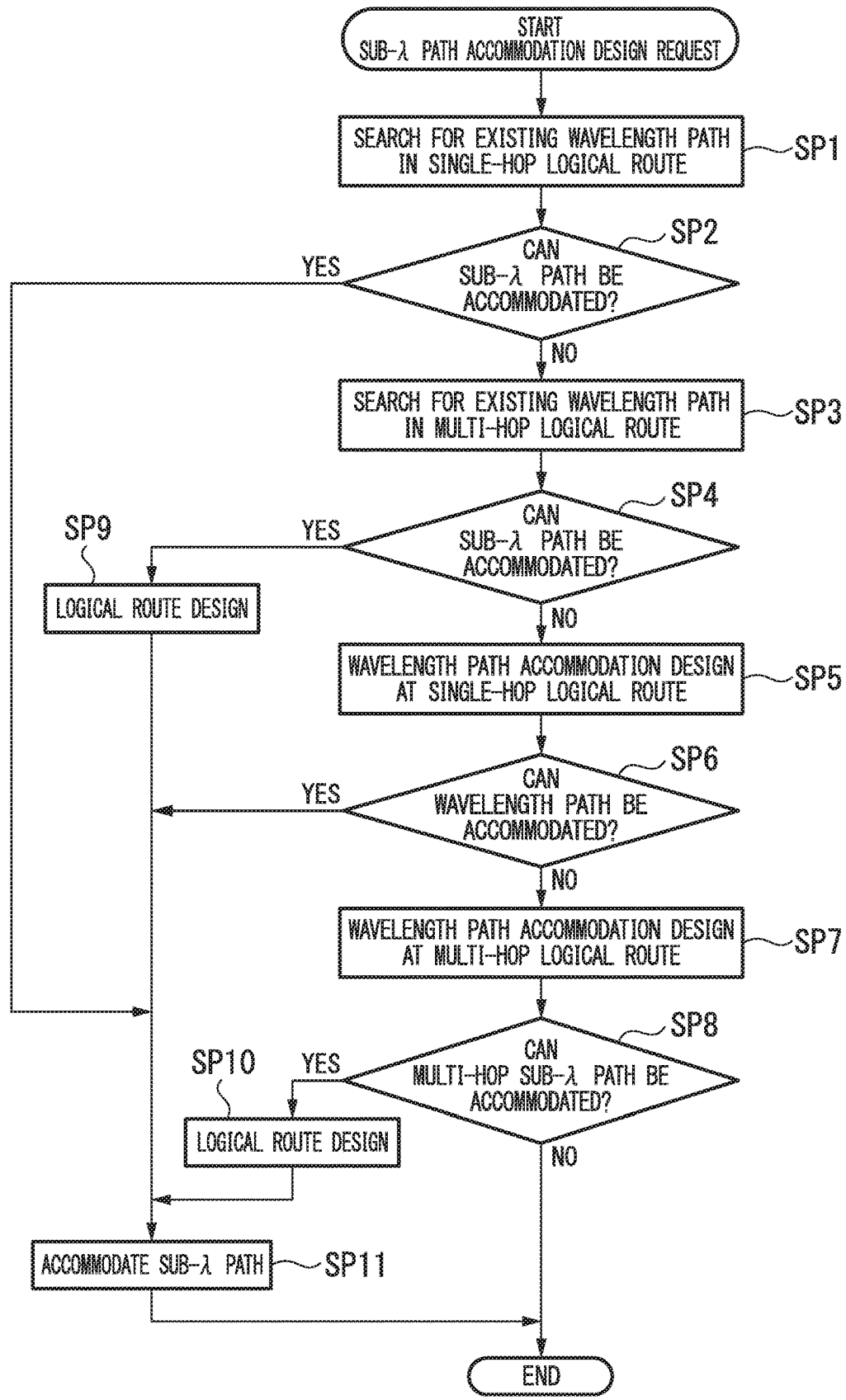
FIG. 2 is a flowchart that shows an operation performed by the path accommodation design apparatus in the first embodiment.

FIG. 2 is a flowchart that shows a sub-$\lambda$ path or wavelength path accommodation design operation performed by the path accommodation design apparatus shown in FIG. 1A.

The operation of FIG. 2 is executed after the sub-$\lambda$ path setting request obtaining unit 1 obtains a sub-$\lambda$ path accommodation design request that includes node information and request band information for the start and end points.

First, the design unit 2 searches for an existing wavelength path in a single-hop logical route (see step SP1). In this search, the network information management unit 3 is searched for (i) information about (the route and the wavelength allocation for) a wavelength path between start and end points which are identical to the start and end points of a path requested utilizing the sub-$\lambda$ path accommodation design request, and (ii) information about a used band (due to the accommodation of the sub-$\lambda$ path) in the relevant wavelength path.

Next, the design unit 2 determines whether or not the existing wavelength path can accommodate a sub-$\lambda$ path (see step SP2).

If it is determined that there is a free band wider than or equal to the request bandwidth and the existing wavelength path can accommodate a sub-$\lambda$ path, the sub-$\lambda$ path accommodation functional unit 25 performs accommodation of a sub-λ path (see step SP11). In this process, the sub-λ path accommodation functional unit 25 updates relevant information by storing band information for the accommodation and information about the route and (allocated) wavelength of the relevant wavelength path in the network information management unit 3. The sub-λ path accommodation functional unit 25 also stores information about the result of the path accommodation design in the operation result storage unit 4. The present operation is then terminated.

In contrast, if it is determined in step SP2 that the existing wavelength path can accommodate no sub-λ path, the design unit 2 searches for an existing wavelength path that is present in a multi-hop logical route (see step SP3). In this search, the network information management unit 3 is searched for (i) information about (the route and the wavelength allocation for) an existing wavelength path that can form a multi-hop logical route which is present between the start and end points of the requested path, and (ii) information about a used band in the relevant wavelength path.

The design unit 2 then determines whether or not the existing wavelength path can accommodate a sub-λ path (see step SP4).

If it is determined that there is a wavelength path which satisfies the relevant request and is present in a multi-hop logical route between the start and end points of the requested path; there is a free band wider than or equal to the request bandwidth; and the existing wavelength path can accommodate a sub-λ path, then the logical route determination functional unit 21 performs the logical route design utilizing the wavelength path obtained by the above search (see step SP9). In this logical route design, a logical route having the smallest number of hops for the physical route is selected. If there are routes having the same number of hops for the physical route, one of the routes which has the smaller number of hops for the logical route is selected. Furthermore, if there are routes having the same number of hops for the logical route, the one which has a smaller wavelength use rate computed by the wavelength use rate computation functional unit 23 is selected. In another example of the present logical design, a route having the smallest number of hops for the logical route is first selected, and if there are routes having the same number of hops for the logical route, the one which has a smaller number of hops for the physical route is selected.

Then the sub-λ path accommodation functional unit 25 performs accommodation of a sub-λ path (see step SP11). In this process, the sub-λ path accommodation functional unit 25 updates relevant information by storing band information for the accommodation and information about the route and (allocated) wavelength of the relevant wavelength path in the network information management unit 3. The sub-λ path accommodation functional unit 25 also stores information about the result of the path accommodation design in the operation result storage unit 4. The present operation is then terminated.

In contrast, if it is determined in step SP4 that the existing wavelength path can accommodate no sub-λ path, the design unit 2 performs the accommodation design of a wavelength path that is present in a single-hop logical route having start and end points identical to the requested start and end points (see step SP5).

In the first step of this accommodation design, the physical route determination functional unit 22 searches for one or more shortest routes. Next, for the shortest routes, the wavelength use rate computation functional unit 23 computes the wavelength use rate of each shortest route and selects a candidate route having the smallest wavelength use rate.

The above wavelength use rate is defined to be the total value (for the links) of the number of wavelengths which are actually used in each link in the relevant route to the total number (for the links) of the maximum number of wavelengths accommodated in each link. A route having a balanced wavelength use rate can be determined by selecting a candidate route having the smallest wavelength use rate.

For the obtained candidate route, the wavelength allocation determination functional unit 24 performs the wavelength path design by retrieving information about an available wavelength from among the information items stored in the network information management unit 3.

The design unit 2 then determines whether or not it is possible to accommodate a wavelength path (see step SP6). If it is determined that the accommodation is possible, a sub-λ path is accommodated in the relevant wavelength path (see step SP11).

In contrast, if it is determined that the accommodation is impossible, the design unit 2 performs the wavelength path accommodation design utilizing a multi-hop logical route based on a combination of an existing wavelength path and a new wavelength path. First, an existing wavelength path having a free band wider than or equal to the request bandwidth is extracted. Next, a new wavelength path accommodation design is performed utilizing the multi-hop logical route, between the star and end nodes of the extracted wavelength path, that is, from a relay node of the sub-λ path to be accommodated to the end node of the sub-λ path to be accommodated (see step SP7).

In the first step of this accommodation design, the physical route determination functional unit 22 searches for one or more shortest routes. Next, for the shortest routes, the wavelength use rate computation functional unit 23 computes the wavelength use rate of each shortest route and selects a candidate route having the smallest wavelength use rate. The above wavelength use rate is also defined to be the total value (for the links) of the number of wavelengths which are actually used in each link in the relevant route to the total number (for the links) of the maximum number of wavelengths accommodated in each link. A route having a balanced wavelength use rate can be determined by selecting a candidate route having the smallest wavelength use rate.

For the obtained candidate route, the wavelength allocation determination functional unit 24 performs the wavelength path design by retrieving information about an available wavelength by means of a search for the information items stored in the network information management unit 3.

The design unit 2 then determines whether or not it is possible to accommodate a sub-λ path in the wavelength path according to the multi-hop logical route (see step SP8). If it is determined that the accommodation is possible, the design unit 2 performs the logical route design (see step SP10).

In this logical route design, for a combination of an existing wavelength path and a new wavelength path or only a new wavelength path, a logical route having the smallest number of hops for the physical route is selected. If there are routes having the same number of hops for the physical route, one of the routes which has the smaller number of hops for the logical route is selected. Furthermore, if there are routes having the same number of hops for the logical route, the one which has a smaller wavelength use rate is selected.

Then the sub-λ path accommodation functional unit 25 performs accommodation of a sub-λ path (see step SP11). In this process, the sub-λ path accommodation functional unit 25 updates relevant information by storing band information for the accommodation and information about the route and (allocated) wavelength of the relevant wavelength path in the network information management unit 3. The sub-λ path accommodation functional unit 25 also stores information about the result of the path accommodation design in the operation result storage unit 4. The present operation is then terminated.

In contrast, if it is determined in step SP8 that it is impossible to accommodate a sub-λ path, the present operation is terminated, and a specific network management apparatus is informed of the impossibility of accommodation.

The above steps SP7, SP8, and SP10 may each be omitted if the relevant fiber has enough available wavelengths.

Figure 3:
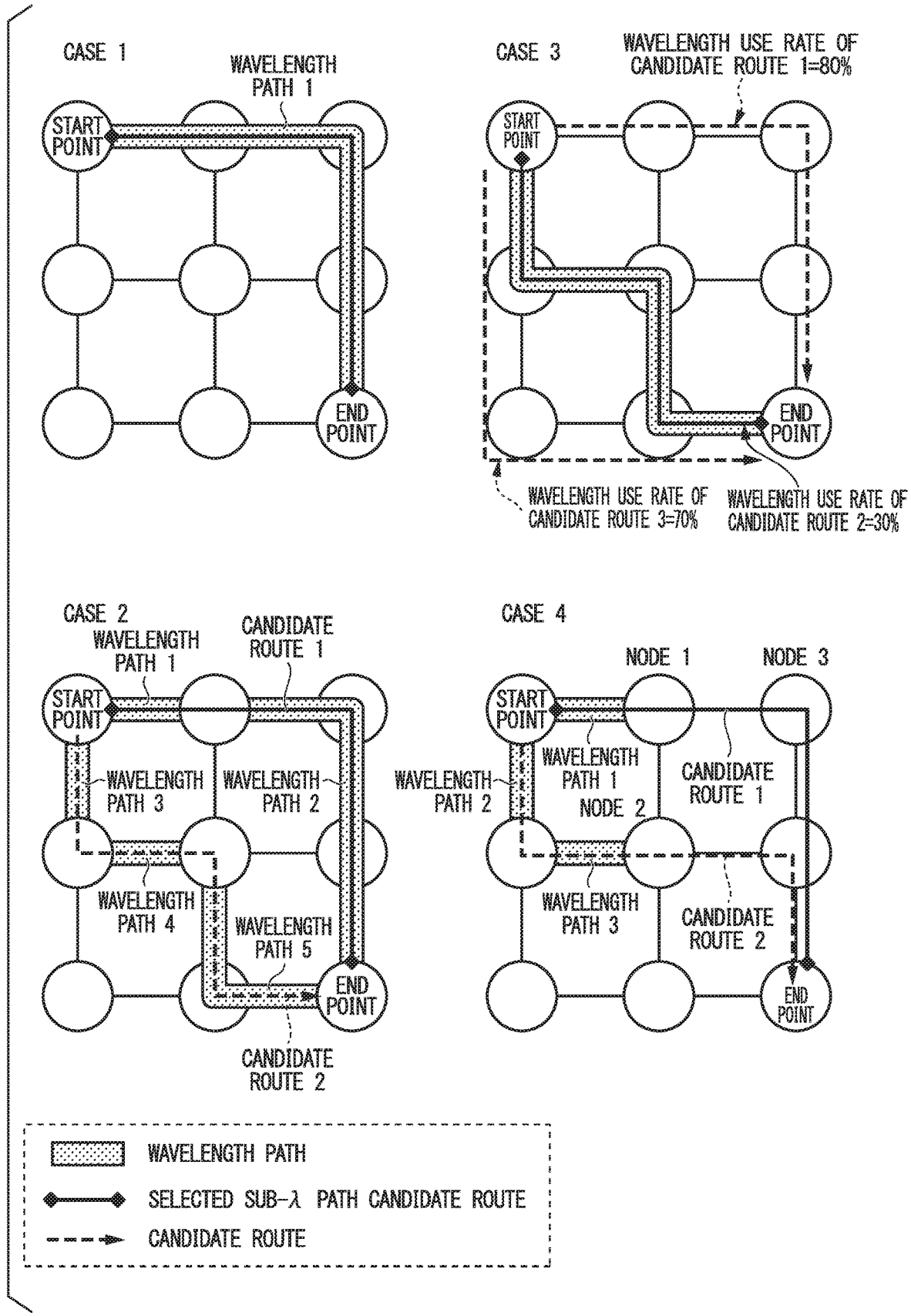
FIG. 3 is a diagram utilized to explain an operation performed by the path accommodation design apparatus shown in FIG. 1A.

Next, with reference to FIG. 3, the processing operation of the first embodiment will be explained for specific examples. FIG. 3 is a diagram utilized to explain the processing operation of the path accommodation design apparatus shown in FIG. 1A. Here, the following four cases will be explained.

Case 1

When "wavelength path 1" accommodable in an existing single-hop logical route is present between the requested start and end points, a sub-λ path is accommodated by steps SP2 and SP11 in FIG. 2.

Case 2

When no wavelength path accommodable in an existing single-hop logical route is present but a wavelength path accommodable in a multi-hop logical route is present, steps SP2, SP3, and SP4 in FIG. 2 are executed and a route having the smallest number of hops is selected from among the candidates for the logical route in step SP9. In the example of FIG. 3, "candidate route 1" uses wavelength paths 1 and 2 where the number of logical route hops is 2 while "candidate route 2" uses wavelength paths 3, 4, and 5 where the number of logical route hops is 3. Therefore, the candidate route 1 having the smaller number of logical hops is selected.

Case 3

When there is no existing wavelength path that satisfies the relevant request in steps SP2 to SP4 of FIG. 2, a new wavelength path accommodable in a single-hop logical route is designed. In this process, a plurality of candidate routes are computed and the one which has the smallest wavelength use rate is selected. In the example of FIG. 3, "candidate route 2" having a wavelength use rate of 30% is selected.

Case 4

When steps SP2 to SP7 of FIG. 2 are performed, a wavelength path accommodable in a multi-hop logical route with respect to combination of an existing wavelength path and a new wavelength path is selected. In the example of FIG. 3, the existing wavelength path is present in each of a route (whose number of logical route hops is 1) from the start point to node 1 and a route (whose number of logical route hops is 2) from the start point to node 2. If a new wavelength path is accommodable in each of "candidate route 1" from node 1 to the end node and "candidate route 2" from node 2 to the end node, the wavelength path accommodation design is performed utilizing the candidate route 1 that has the smaller logical route together with the existing wavelength path.

Second Embodiment

Below, a path accommodation design apparatus according to a second embodiment of the present invention will be explained. Since the configuration of the apparatus in the second embodiment is equivalent to that of the apparatus in FIG. 1A, detailed explanations thereof are omitted here.

In the second embodiment, a sub-λ path that passes a grooming node (which bundles a plurality of sub-λ paths) is always electrically processed. Accordingly, in comparison with the first embodiment, the larger the accommodated traffic, the lower the accommodation efficiency becomes, but the amount of computation is smaller and the relevant maintenance operation can be more easily performed.

Figure 4:
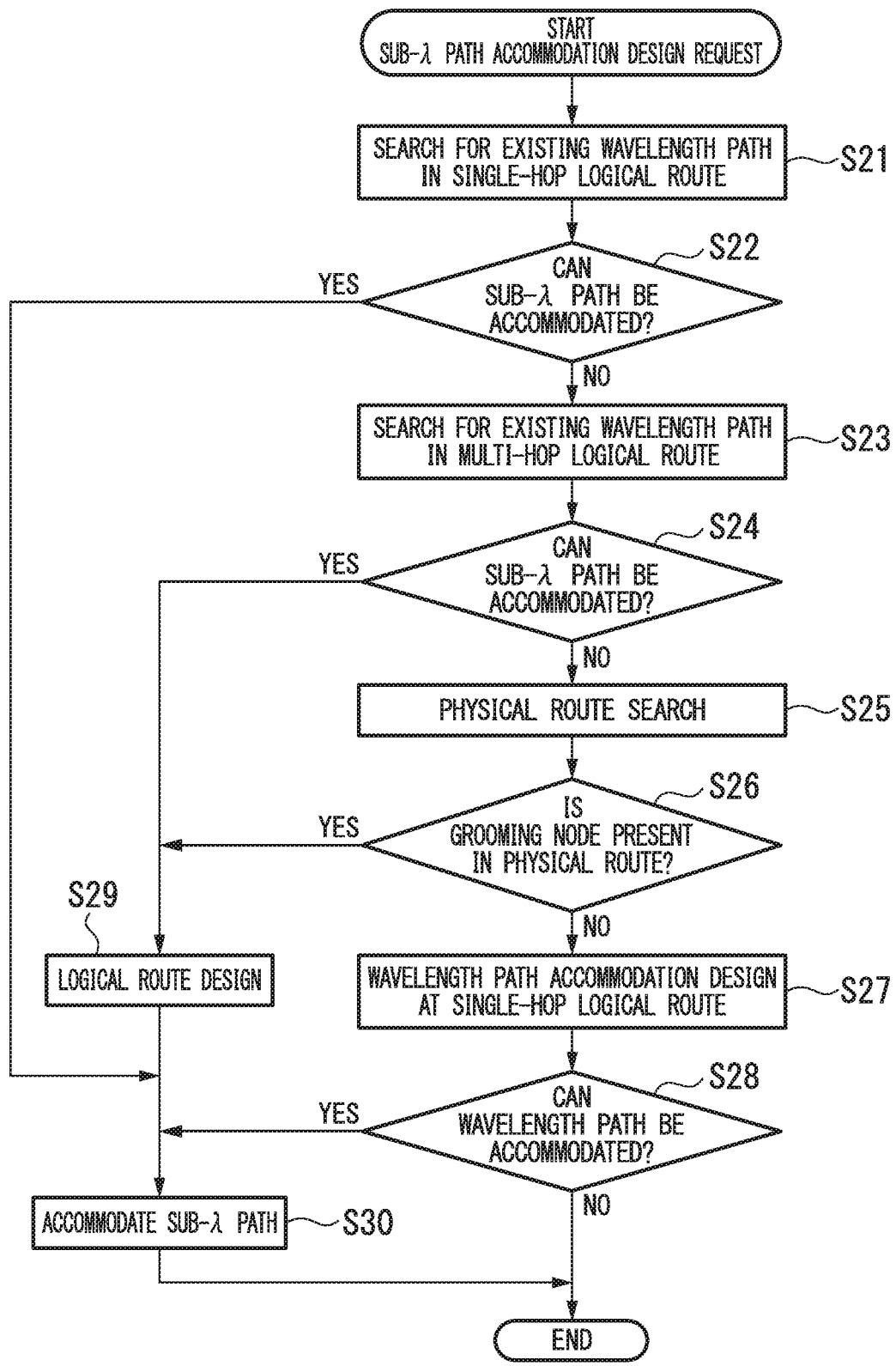
FIG. 4 is a flowchart that shows an operation performed by the path accommodation design apparatus of a second embodiment according to the present invention.

FIG. 4 is a flowchart that shows a sub-λ path or wavelength path accommodation design operation performed by the path accommodation design apparatus of the second embodiment.

The operation of FIG. 4 is executed after the sub-λ path setting request obtaining unit 1 obtains a sub-λ path accommodation design request that includes node information and design band information for the start and end points.

First, the design unit 2 searches for an existing wavelength path in a single-hop logical route (see step S21). In this search, similar to the first embodiment, the network information management unit 3 is searched for (i) information about (the route and the wavelength allocation for) a wavelength path between start and end points which are identical to the start and end points of a path requested utilizing the sub-λ path accommodation design request, and (ii) information about a used band (due to the accommodation of the sub-λ path) in the relevant wavelength path.

Next, the design unit 2 determines whether or not the existing wavelength path can accommodate a sub-λ path (see step S22).

If it is determined that there is a free band wider than or equal to the request bandwidth and the existing wavelength path can accommodate a sub-λ path, the sub-λ path accommodation functional unit 25 performs accommodation of a sub-λ path (see step S30). In this process, the sub-λ path accommodation functional unit 25 updates relevant information by storing band information for the accommodation and information about the route and (allocated) wavelength of the relevant wavelength path in the network information management unit 3. The sub-λ path accommodation functional unit 25 also stores information about the result of the path accommodation design in the operation result storage unit 4. The present operation is then terminated.

In contrast, if it is determined in step S22 that the existing wavelength path can accommodate no sub-λ path, the design unit 2 searches for an existing wavelength path that is present in a multi-hop logical route (see step S23). In this search, the network information management unit 3 is searched for (i) information about (the route and the wavelength allocation for) an existing wavelength path that can form a multi-hop logical route which is present between the start and end points of the requested path, and (ii) information about a used band in the relevant wavelength path.

The design unit 2 then determines whether or not the existing wavelength path can accommodate a sub-λ path (see step S24).

If it is determined that there is a wavelength path which satisfies the relevant request and is present in a multi-hop logical route between the start and end points of the requested path; there is a free band wider than or equal to the request bandwidth; and the existing wavelength path can accommodate a sub-λ path, then the logical route determination functional unit 21 performs the logical route design utilizing the wavelength path obtained by the above search (see step S29).

In this logical route design, for an existing wavelength path or a combination of an existing wavelength path and a new wavelength path, a logical route having the smallest number of hops for the physical route is selected. If there are routes having the same number of hops for the physical route, one of the routes which has the smaller number of hops for the logical route is selected. Furthermore, if there are routes having the same number of hops for the logical route, the one which has a smaller wavelength use rate computed by the wavelength use rate computation functional unit 23 is selected. In another example of the present logical design, a route having the smallest number of hops for the logical route is first selected, and if there are routes having the same number of hops for the logical route, the one which has a smaller number of hops for the physical route is selected.

Then the sub-$\lambda$ path accommodation functional unit 25 performs accommodation of a sub-$\lambda$ path (see step S30). In this process, the sub-$\lambda$ path accommodation functional unit 25 updates relevant information by storing band information for the accommodation and information about the route and wavelength of the relevant wavelength path in the network information management unit 3. The sub-$\lambda$ path accommodation functional unit 25 also stores information about the result of the path accommodation design in the operation result storage unit 4. The present operation is then terminated.

In contrast, if it is determined in step S24 that no sub-$\lambda$ path can be accommodated, the design unit 2 searches for one or more shortest physical routes present between the requested start and end points (see step S25). The design unit 2 then determines whether or not there is a grooming node on any obtained candidate route (see step S26).

If it is determined that there is a grooming node, the logical route determination functional unit 21 performs the logical route design utilizing the wavelength path obtained by the above search (see step S29).

In this logical route design, a logical route having the smallest number of hops for the physical route is selected. If there are routes having the same number of hops for the physical route, one of the routes which has the smaller number of hops for the logical route is selected. Furthermore, if there are routes having the same number of hops for the logical route, the one which has a smaller wavelength use rate is selected.

Then the sub-$\lambda$ path accommodation functional unit 25 performs accommodation of a sub-$\lambda$ path (see step S30). In this process, the sub-$\lambda$ path accommodation functional unit 25 updates relevant information by storing band information for the accommodation and information about the route and wavelength of the relevant wavelength path in the network information management unit 3. The sub-$\lambda$ path accommodation functional unit 25 also stores information about the result of the path accommodation design in the operation result storage unit 4. The present operation is then terminated.

In contrast, if there is no grooming node, the design unit 2 performs the accommodation design of a wavelength path that is present in a single-hop logical route having start and end points identical to the requested start and end points (see step S27).

In the first step of this accommodation design, the physical route determination functional unit 22 searches for one or more shortest routes. Next, for the shortest routes, the wavelength use rate computation functional unit 23 computes the wavelength use rate of each shortest route and selects a candidate route having the smallest wavelength use rate. The above wavelength use rate is again defined to be the total value (for the links) of the number of wavelengths which are actually used in each link in the relevant route to the total number (for the links) of the maximum number of wavelengths accommodated in each link.

For the obtained candidate route, the wavelength allocation determination functional unit 24 performs the wavelength path design by retrieving information about an available wavelength from among the information items stored in the network information management unit 3.

The design unit 2 then determines whether or not it is possible to accommodate a wavelength path (see step S28). If it is determined that the accommodation is possible, a sub-$\lambda$ path is accommodated in the relevant wavelength path (see step S30). In this process, the sub-$\lambda$ path accommodation functional unit 25 updates relevant information by storing band information for the accommodation and information about the route and wavelength of the relevant wavelength path in the network information management unit 3. The sub-$\lambda$ path accommodation functional unit 25 also stores information about the result of the path accommodation design in the operation result storage unit 4. The present operation is then terminated.

In contrast, if no wavelength path can be accommodated, the present operation is terminated, and a specific network management apparatus is informed of the impossibility of accommodation.

Variation

As a method of designing each wavelength path that produces no uneven route arrangement, each target path may be randomly selected from among paths having the same number of hops for the wavelength path or the sub-$\lambda$ path, the same wavelength use rate, the same number of grooming nodes, or the like.

However, as described above, it is preferable to employ a method of selecting a route having a smaller number of logical route hops and a smaller number of physical route hops, where for the physical route, one having a smaller wavelength use rate is preferable. The reason is that even when unevenness route arrangement is produced, this method determines the degree of unevenness and performs the path selection so as to reduce the unevenness, so that unevenness hardly occurs in comparison with the randomly selected method as the variation. Therefore, even if the unevenness occurs, the preferable method can cancel it and thus can reliably disperse the route.

Third Embodiment

Below, a path accommodation design apparatus according to a third embodiment of the present invention will be explained with reference to the drawings.

Figure 1B:
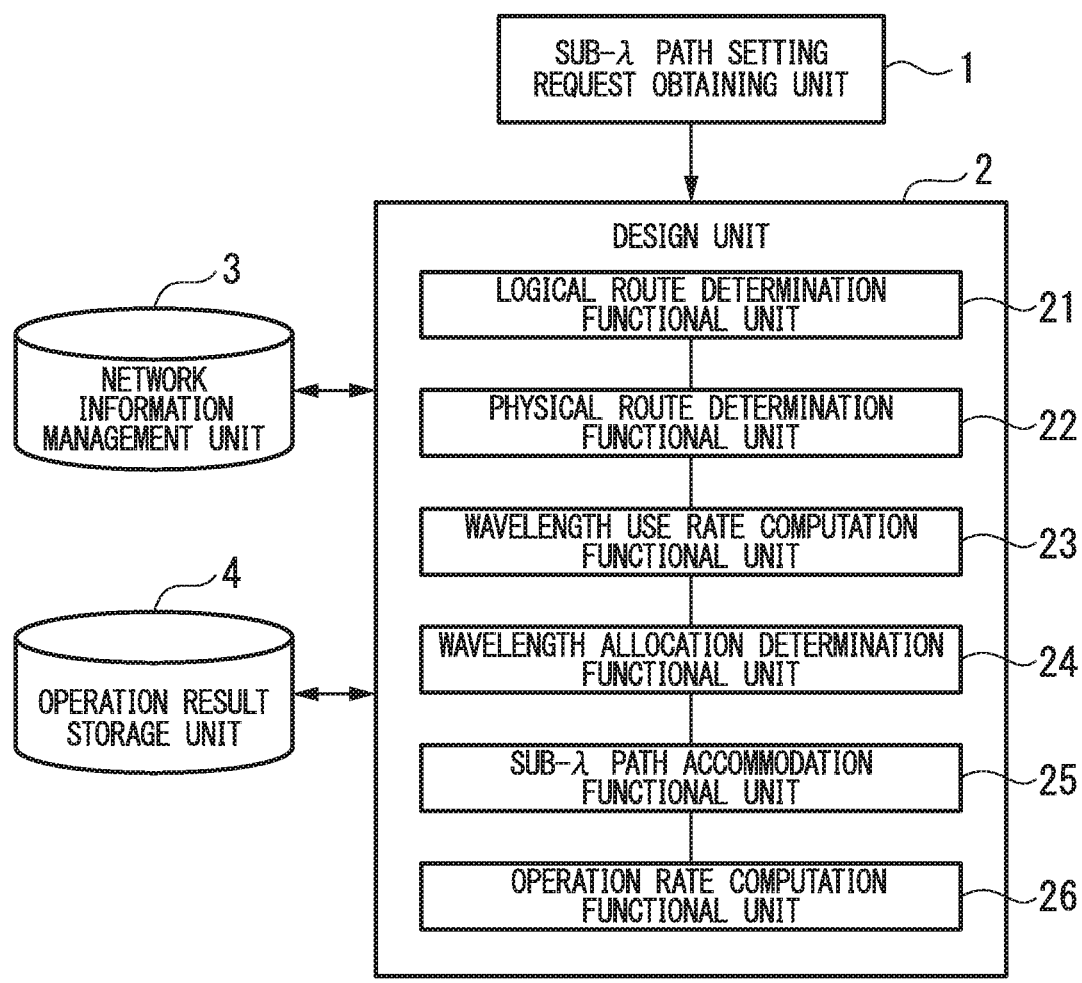
FIG. 1B is a block diagram that shows the configuration of a third embodiment according to the present invention.

The configuration of the apparatus in the third embodiment is shown in FIG. 1B. In this configuration, an operation rate computation functional unit 26 is added to the configuration of FIG. 1A.

The operation rate computation functional unit 26 is a functional unit that computes an operation rate for a combination of a plurality of redundant routes by utilizing operation rates of nodes, fibers, links, and the like, which are stored in the network information management unit 3.

The sub-$\lambda$ path setting request obtaining unit 1 obtains node pairs of the stand and end points, where the number of the node pairs corresponds to the number of the redundant routes whose setting is requested. The sub-$\lambda$ path setting request obtaining unit 1 may also obtain as a quality requirement to be satisfied, information that includes (i) the operation rate or (ii) the number of nodes, the pipeline distance, and the number of links which are permitted to be overlapped, or information that includes both the above item (i) and the above item (ii).

Figure 5:
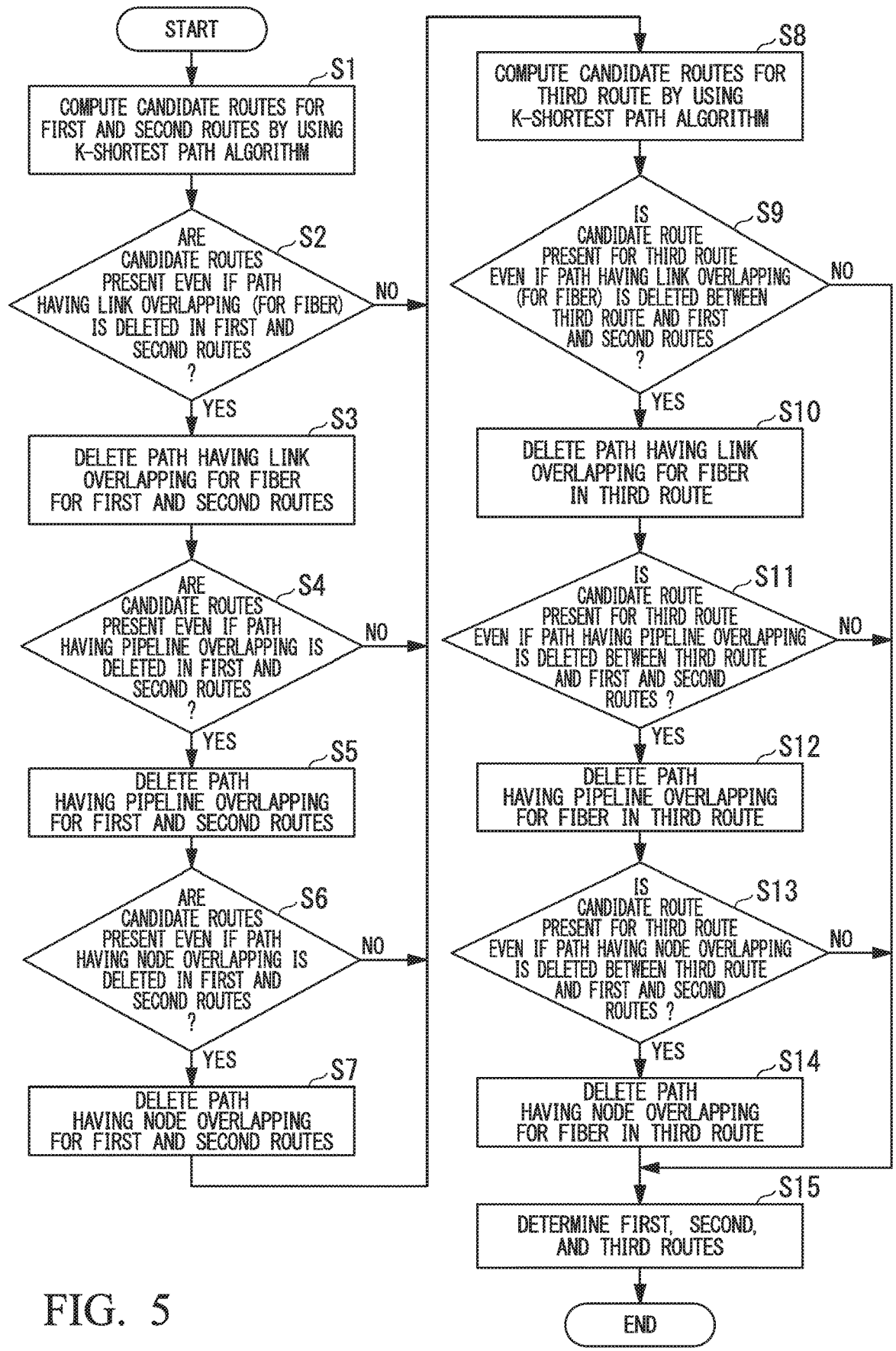
FIG. 5 is a flowchart that shows an operation performed by the path accommodation design apparatus of the third embodiment.

FIG. 5 is a flowchart that shows the operation of the path accommodation design apparatus in FIG. 1B.

In the present embodiment, the path accommodation design apparatus computes a predetermined number of communication routes (which may be simply called the "routes"). The predetermined number of the communication routes may be the number of communication routes acquired based on (i) the degree of redundancy that is designated when the relevant system is designed, or (ii) a failure rate that is designated when the system is designed and a fault rate of the relevant route. If the degree of redundancy is 2, the number of communication routes may be set to 2. If the efficiently of a target route is 50% while the fault rate designated at the system design is 25%, then the number of communication routes may be set to 2.

The physical route determination functional unit 22 first refers to the information stored in the network information management unit 3 so as to compute a plurality of candidate routes for the node pair of the start and end points of the first route and also candidate routes for the node pair of the start and end points of the second route, by utilizing a k-shortest path algorithm (see step S1). In this process, the start nodes (or end nodes) of the two routes need not to be the same.

The physical route determination functional unit 22 then determines for the two routes, whether or not two candidate routes remain even if each route (path) at which link overlapping for a fiber occurs is deleted (see step S2). Here, the link overlapping for a fiber means that two more routes pass through a single fiber.

If it is determined that two candidate routes do not remain, one or more combinations of two routes with the least amount of overlapping are selected and the operation proceeds to step S8.

In contrast, if it is determined in step S2 that two candidate routes remain, the physical route determination functional unit 22 deletes each route (or path) having the link overlapping for a fiber for the first and second routes (see step S3).

Additionally, a case if the permissible number of overlapped nodes is obtained as a quality requirement will be explained. The physical route determination functional unit 22 computes candidate routes for the node pair of the start and end points of the first route and then computes candidate routes for the node pair of the start and end points of the second route. When the candidates for the second route are computed, if the number of overlapped nodes for a fiber exceeds an upper limit as the quality requirement, then the present route computation is interrupted and the next route search is started to compute the relevant candidates (see steps S1 and S2). If two or more candidates are not present, one or more combinations of two routes with the least amount of overlapping are selected and the operation proceeds to step S8.

If the operation rate is designated as the quality requirement, then after step S1, the operation rate is computed (by the operation rate computation functional unit 26) for each combination. If the computed rate exceeds an upper limit as the quality requirement, the relevant combination is cancelled. The method of computing the operation rate is described, for example, in the following Non-Patent Document. In addition, the operation rate computation method will be explained in detail at the last part of the sixth embodiment.

Non-Patent Document: Masahiro Hayashi and Takeo Abe, "Tsuushin Nettowa-ku no Shinraisei (Reliability of Communication Network)", IEICE If two or more candidates are not present, one or more combinations of two routes with the least amount of overlapping are selected and the operation proceeds to step S8.

On the other hand, a case if the permissible number of overlapped nodes and the operation rate are obtained as the quality requirement will be explained. When the candidates for the second route are computed in step S1, if the number of overlapped nodes for a fiber exceeds an upper limit as the quality requirement, then the present route computation is interrupted and the next route search is started to compute the relevant candidates. Next, the operation rate is computed (by the operation rate computation functional unit 26) for each combination. If the computed rate exceeds an upper limit as the quality requirement, the relevant combination is cancelled. If two or more candidates are not present, one or more combinations of two routes with the least amount of overlapping are selected and the operation proceeds to step S8.

Here, if the sub-λ path setting request obtaining unit 1 obtains a quality requirement, a similar procedure may be applied to the route design having no overlapping for pipeline or node by replacing the above-described "link" with "pipeline" or "node". A similar procedure may also be applied to computation of the third route, which is performed after step S8.

The physical route determination functional unit 22 then determines for the first and second routes, whether or not two candidate routes remain even if each route (path) at which pipeline overlapping occurs is deleted (see step S4). Here, the pipeline overlapping means that two more routes pass through a single pipeline (where they pass through different fibers).

If it is determined that two candidate routes do not remain, one or more combinations of two routes with the least amount of overlapping are selected and the operation proceeds to step S8.

In contrast, if it is determined in step S4 that two candidate routes remain, the physical route determination functional unit 22 deletes each route (or path) having the pipeline overlapping for the first and second routes (see step S5).

The physical route determination functional unit 22 then determines for the first and second routes, whether or not two candidate routes remain even if each route (path) at which node overlapping occurs is deleted (see step S6). Here, the node overlapping means that two more routes pass through a single node.

If it is determined that two candidate routes do not remain, one or more combinations of two routes with the least amount of overlapping are selected and the operation proceeds to step S8.

In contrast, if it is determined in step S6 that two candidate routes remain, the physical route determination functional unit 22 deletes each route (or path) having the node overlapping for the first and second routes (see step S7).

Next, the physical route determination functional unit 22 refers to the information stored in the network information management unit 3 so as to compute candidate routes (that differ from the first and second routes) for the node pair of the start and end points of the third route by utilizing a k-shortest path algorithm (see step S8).

In this process, an operation utilizing the k-shortest path algorithm may be performed with an input value which is physical topology information in which links in the routes of each combination that has remained after the foregoing steps are deleted.

When there are a plurality of combinations of two remaining candidate routes, the third route is determined for each of the combinations through the following steps. In the combinations, the third route is determined in order from the smallest to the largest for the total number of hops of the two routes of each combination, or from the shortest to the longest for the total length of the relevant two routes.

The physical route determination functional unit 22 then determines for the third route and the first and second routes, whether or not a candidate for the third route remains even if each route (path) at which link overlapping for a fiber occurs is deleted (see step S9).

If it is determined that two candidate routes do not remain, one or more combinations of three routes with the least amount of overlapping are selected and the operation proceeds to step S15.

When there is other remaining combination(s) of two routes, the operation result of the present computation is temporarily stored in the operation result storage unit 4, and the processing from step S9 is again applied to the next combination.

When no candidate route of the third route is present for all combinations of two routes computed up to step S7 (i.e., no candidate route was determined in the above step S8), the operation proceeds to step S15.

In contrast, if it is determined in step S9 that there remains a candidate route for the third route, the physical route determination functional unit 22 deletes each route (or path) having the link overlapping for a fiber in the third route (see step S10).

The physical route determination functional unit 22 then determines for the third route and the first and second routes, whether or not a candidate for the third route remains even if each route (path) at which pipeline overlapping occurs is deleted (see step S11).

If it is determined that two candidate routes do not remain, one or more combinations of three routes with the least amount of overlapping are selected and the operation proceeds to step S15.

When there is still other remaining combination(s) of two routes, the operation result of the present computation is temporarily stored in the operation result storage unit 4, and the processing from step S9 is again applied to the next combination.

When no candidate route of the third route is present for all combinations of two routes computed up to step S7, the operation proceeds to step S15.

In contrast, if it is determined in step S11 that there remains a candidate route for the third route, the physical route determination functional unit 22 deletes each route (or path) having the pipeline overlapping in the third route (see step S12).

The physical route determination functional unit 22 then determines for the third route and the first and second routes, whether or not a candidate for the third route remains even if each route (path) at which node overlapping occurs is deleted (see step S13).

If it is determined that two candidate routes do not remain, one or more combinations of three routes with the least amount of overlapping are selected and the operation proceeds to step S15.

When there is still other remaining combination(s) of two routes, the operation result of the present computation is temporarily stored in the operation result storage unit 4, and the processing from step S9 is again applied to the next combination.

When no candidate route of the third route is present for all combinations of two routes computed up to step S7, the operation proceeds to step S15.

In contrast, if it is determined in step S11 that there remains a candidate route for the third route, the physical route determination functional unit 22 deletes each route (or path) having the node overlapping in the third route (see step S14).

After the relevant processing is applied to all combinations of two routes computed up to step S7, the physical route determination functional unit 22 determines from among currently remaining combinations of three candidate routes, which may be temporarily stored as described above, one having the smallest number of overlapping nodes or links or having the shortest route length for the first, second, and third routes to be a selected combination of the first, second, and third routes (see step S15).

The physical route determination functional unit 22 then stores the determined routes in the operation result storage unit 4.

If a predetermined number of communication routes cannot be computed due to the route deletion, then from among the candidate routes, communication routes having the smallest number of nodes or the shortest route length may be determined to be redundant communication routes.

As a route computation method for four or more routes, the processing from step S8 to S14 in FIG. 5 may be repeated a required number of times.

In the route deleting process of the operation in FIG. 5, after each route having the link overlapping is deleted, each route having the pipeline overlapping and then each route having the node overlapping is deleted. However, after each route having the node overlapping is deleted, each route having the pipeline overlapping may be deleted. Therefore, the route deletion may be executed in any order.

In addition, the condition branches at steps S2, S4, S6, S9, S10, S11, and S13 may be omitted and a combination by which the link, pipeline, and node overlapping items decrease in order of the relevant steps (for example, in order of steps S3, S5, and S7) may be selected. In another example, the condition branch is omitted for the selection of the first and second routes and is effective for the third route, and vice versa.

Furthermore, for a case which has a large-sized network and thus requires a great amount of computation, there is a method of reducing the amount of computation.

For example, if in step S8, there are a plurality of combinations of two routes determined in the previous steps, the process of determining the third route is executed with only one candidate route having the smallest total number of hops or the shortest total route length for the relevant two routes, where the operation from step S9 is not repeated.

Fourth Embodiment

Below, a path accommodation design apparatus according to a fourth embodiment of the present invention will be explained.

Since the configuration of the apparatus in the fourth embodiment is equivalent to that of the apparatus in FIG. 1B, detailed explanations thereof are omitted here.

Figure 6:
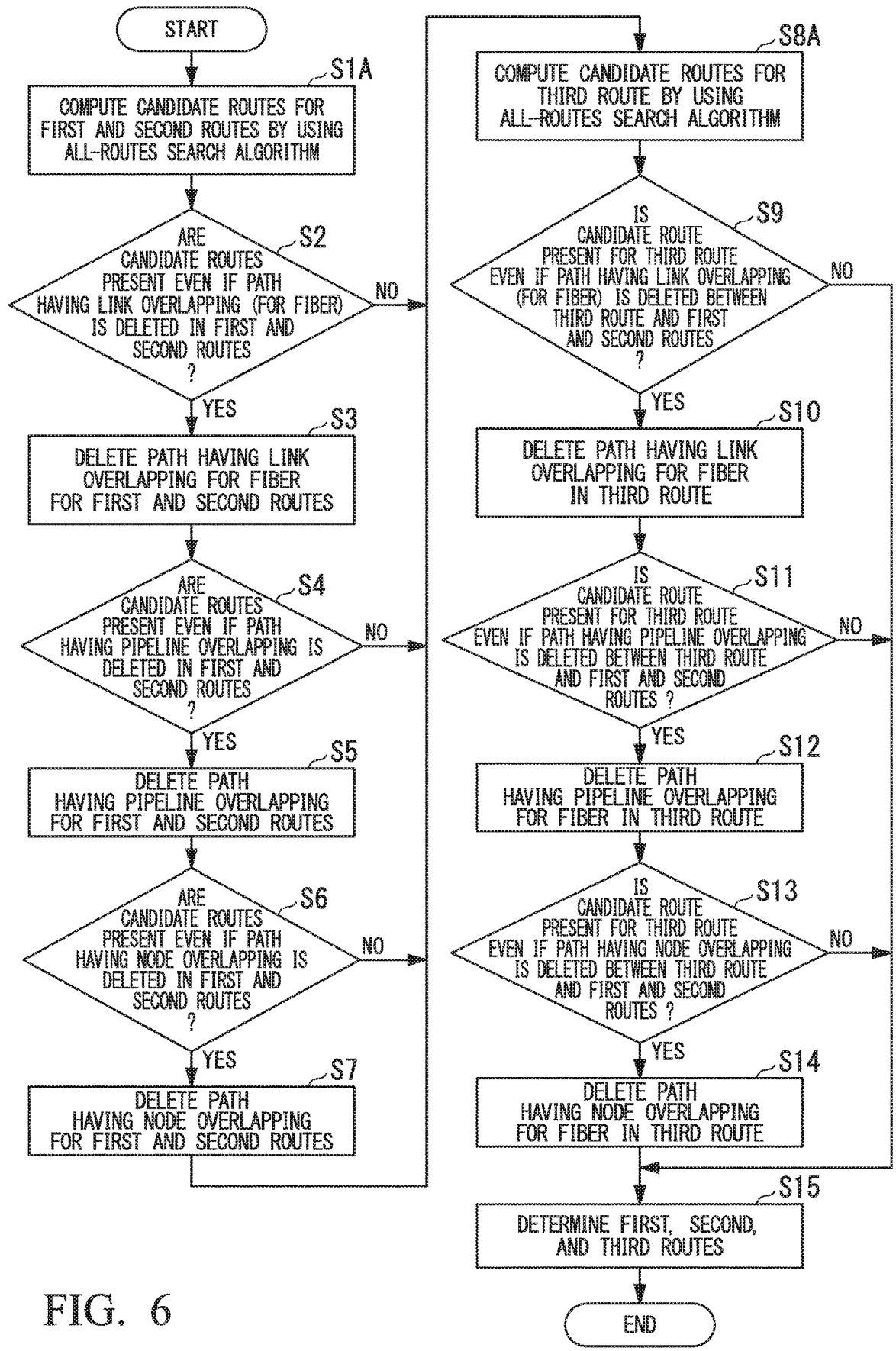
FIG. 6 is a flowchart that shows an operation performed by the path accommodation design apparatus of a fourth embodiment according to the present invention.

FIG. 6 is a flowchart that shows the operation of the path accommodation design apparatus in the fourth embodiment. In FIG. 6, parts identical to those in the operation shown in FIG. 5 are given identical reference symbols and explanations thereof are simplified.

In comparison with the operation of FIG. 5, the operation of FIG. 6 has a distinctive feature that all-routes search is performed in the candidate route computation in steps S1A and S8A.

Below, the operation of the path accommodation design apparatus in the fourth embodiment will be explained with reference to FIG. 6.

The physical route determination functional unit 22 first refers to the information stored in the network information management unit 3 so as to compute a plurality of candidate routes (here, for the first and second routes) by utilizing an all-routes search algorithm (e.g., breadth-first search algorithm) (see step S1A). In this process, the start nodes (or end nodes) of the two routes need not be the same.

The physical route determination functional unit 22 then determines for the first and second routes, whether or not two candidate routes remain even if each route (path) at which link overlapping for a fiber occurs is deleted (see step S2).

If it is determined that two candidate routes do not remain, one or more combinations of two routes with the least amount of overlapping are selected and the operation proceeds to step S8A.

In contrast, if two candidate routes remain, the physical route determination functional unit 22 deletes each route (or path) having the link overlapping for a fiber for the first and second routes (see step S3).

Here, if the permissible number of overlapping nodes is obtained as a quality requirement, the operation rate as the quality requirement is designated, or both the permissible number of overlapping nodes and the operation rate are obtained as the quality requirement, then a combination of the two routes is selected in consideration of the quality requirement according to a method similar to the third embodiment. In addition, as described in the third embodiment, steps S5 and S7 described later are also similarly executed. Furthermore, in the third route computation from step S8, a procedure similar to the third embodiment may be executed.

The physical route determination functional unit 22 then determines for the first and second routes, whether or not candidate routes remain even if each route (path) at which pipeline overlapping occurs is deleted (see step S4).

If it is determined that two candidate routes do not remain, one or more combinations of two routes with the least amount of overlapping are selected and the operation proceeds to step S8A.

In contrast, if relevant candidate routes remain, the physical route determination functional unit 22 deletes each route (or path) having the pipeline overlapping for the first and second routes (see step S5).

The physical route determination functional unit 22 then determines for the first and second routes, whether or not candidate routes remain even if each route (path) at which node overlapping occurs is deleted (see step S6).

If it is determined that two candidate routes do not remain, one or more combinations of two routes with the least amount of overlapping are selected and the operation proceeds to step S8A.

In contrast, if relevant candidate routes remain, the physical route determination functional unit 22 deletes each route (or path) having the node overlapping for the first and second routes (see step S7).

Next, the physical route determination functional unit 22 refers to the information stored in the network information management unit 3 so as to compute candidate routes (that differ from the first and second routes) for the node pair of the start and end points of the third route by utilizing an all-routes search algorithm (e.g., breadth-first search algorithm) (see step S8A).

In this process, an operation utilizing the route search algorithm may be performed with an input value which is physical topology information in which links in the routes of each combination that has remained after the foregoing steps are deleted.

When there are a plurality of combinations of two remaining candidate routes, the third route is determined for each of the combinations through the following steps. In the combinations, the third route is determined in order from the smallest to the largest for the total number of hops of the two routes of each combination, or from the shortest to the longest for the total length of the relevant two routes.

The physical route determination functional unit 22 then determines for the third route and the first and second routes, whether or not a candidate for the third route remains even if each route (path) at which link overlapping for a fiber occurs is deleted (see step S9).

If it is determined that two candidate routes do not remain, one or more combinations with the least amount of overlapping are selected and the operation proceeds to step S15.

When there is other combination(s) of two routes, the operation result of the present computation is temporarily stored in the operation result storage unit 4, and the processing from step S9 is again applied to the next combination. When no candidate route of the third route is present for all remaining combinations of two routes, the operation proceeds to step S15. Such an operation is also performed in relevant determination processes described later.

In contrast, if there remains a candidate route for the third route in step S9, the physical route determination functional unit 22 deletes each route (or path) having the link overlapping for a fiber in the third route (see step S10).

The physical route determination functional unit 22 then determines for the third route and the first and second routes, whether or not a candidate for the third route remains even if each route (path) at which pipeline overlapping occurs is deleted (see step S11).

If it is determined that two candidate routes do not remain, one or more combinations with the least amount of overlapping are selected and the operation proceeds to step S15.

In contrast, if there remains a candidate route for the third route, the physical route determination functional unit 22 deletes each route (or path) having the pipeline overlapping in the third route (see step S12).

The physical route determination functional unit 22 then determines for the third route and the first and second routes, whether or not a candidate for the third route remains even if each route (path) at which node overlapping occurs is deleted (see step S13).

If it is determined that no candidate route remains, one or more combinations of three routes with the least amount of overlapping are selected and the operation proceeds to step S15.

In contrast, if there remains a candidate route for the third route, the physical route determination functional unit 22 deletes each route (or path) having the node overlapping in the third route (see step S14).

After the relevant processing is applied to all combinations of two routes computed up to step S7, the physical route determination functional unit 22 determines from among currently remaining combinations of three candidate routes, which may be temporarily stored as described above, one having the smallest number of overlapping nodes for the first, second, and third routes to be a selected combination of the first, second, and third routes (see step S15).

The physical route determination functional unit 22 then stores the determined routes in the operation result storage unit 4.

As described above, in the route computation, no the k-shortest path algorithm but the all-routes search algorithm (e.g., breadth-first search algorithm) is utilized. Therefore, in comparison with the k-shortest path algorithm, the fiber overlapping, the pipeline overlapping, and the node overlapping can be more reliably avoided, and thus a highly reliable network can be implemented.

Similar to the third embodiment, as a route computation method for four or more routes, the processing from step S8A to S14 in FIG. 6 may be repeated a required number of times.

Additionally, in the route deleting process of the operation in FIG. 6, after each route having the link overlapping is deleted, each route having the pipeline overlapping and then each route having the node overlapping is deleted. However, after each route having the node overlapping is deleted, each route having the pipeline overlapping may be deleted. Therefore, the route deletion may be executed in any order.

In addition, the condition branches at steps S2, S4, S6, S9, S10, S11, and S13 may be omitted and a combination by which the link, pipeline, and node overlapping items decrease in order of the relevant steps (for example, in order of steps S3, S5, and S7) may be selected. In another example, the condition branch is omitted for the selection of the first and second routes and is effective for the third route, and vice versa.

Furthermore, for a case which has a large-sized network and thus requires a great amount of computation, there is a method of reducing the amount of computation.

For example, if in step S8A, there are a plurality of combinations of two routes determined in the previous steps, the process of determining the third route is executed with only the candidate route having the smallest total number of hops or the shortest total route length for the relevant two routes, where the operation from step S9 is not repeated.

Fifth Embodiment

Below, a path accommodation design apparatus according to a fifth embodiment of the present invention will be explained.

Since the configuration of the apparatus in the fifth embodiment is also equivalent to that of the apparatus in FIG. 1B, detailed explanations thereof are omitted here.

Figure 7:
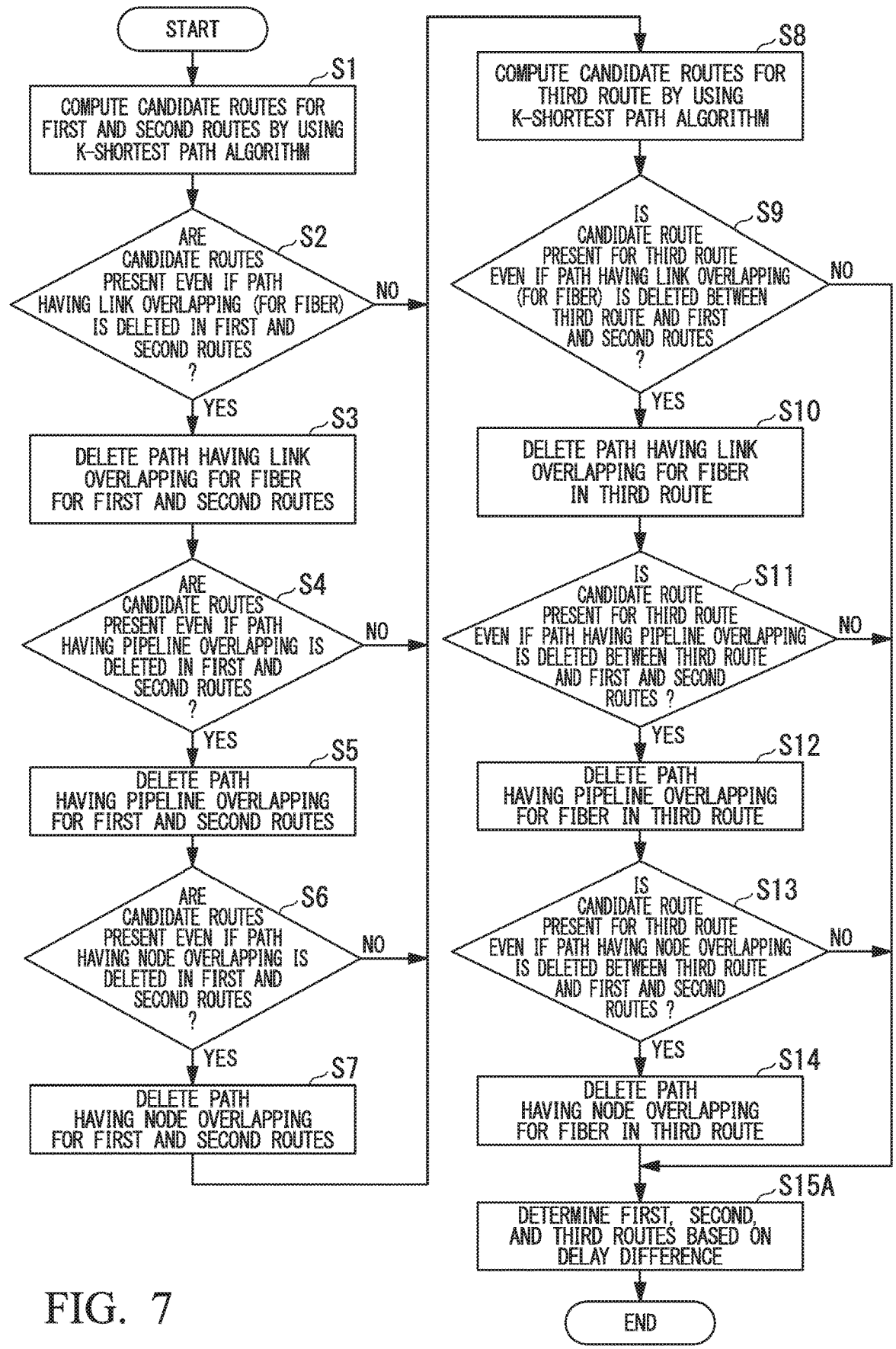
FIG. 7 is a flowchart that shows an operation performed by the path accommodation design apparatus of a fifth embodiment according to the present invention.

FIG. 7 is a flowchart that shows the operation of the path accommodation design apparatus in the fifth embodiment. In FIG. 7, parts identical to those in the operation shown in FIG. 5 are given identical reference symbols and explanations thereof are simplified.

In comparison with the operation of FIG. 5, the operation of FIG. 7 has a distinctive feature that in the route determination in step S15A, delay difference (i.e., difference in route length) between the individual pair of the routes is computed, and the routes whose combination of the delay difference values is smallest are selected.

Below, the operation of the path accommodation design apparatus in the fifth embodiment will be explained with reference to FIG. 7.

The physical route determination functional unit 22 first refers to the information stored in the network information management unit 3 so as to compute a plurality of candidate routes for each node pair of the start and end points (here, for the first and second routes) by utilizing a k-shortest path algorithm (see step S1). In this process, the start nodes (or end nodes) of the two routes do not need to be the same.

The physical route determination functional unit 22 then determines for the first and second routes, whether or not two candidate routes remain even if each route (path) at which the above-described link overlapping for a fiber occurs is deleted (see step S2).

If it is determined that two candidate routes do not remain, one or more combinations of two routes with the least amount of overlapping are selected and the operation proceeds to step S8.

In contrast, if two candidate routes remain, the physical route determination functional unit 22 deletes each route (or path) having the link overlapping for a fiber for the first and second routes (see step S3).

Here, if the permissible number of overlapping nodes is obtained as a quality requirement, the operation rate as the quality requirement is designated, or both the permissible number of overlapping nodes and the operation rate are obtained as the quality requirement, then a combination of the two routes is selected in consideration of the quality requirement according to a method similar to the third embodiment. In addition, as described in the third embodiment, steps S5 and S7 described later are also similarly executed. Furthermore, in the third route computation from step S8, a procedure similar to the third embodiment may be executed.

The physical route determination functional unit 22 then determines for the first and second routes, whether or not candidate routes remain even if each route (path) at which pipeline overlapping occurs is deleted (see step S4).

If it is determined that two candidate routes do not remain, one or more combinations of two routes with the least amount of overlapping are selected and the operation proceeds to step S8.

In contrast, if relevant candidate routes remain, the physical route determination functional unit 22 deletes each route (or path) having the pipeline overlapping for the first and second routes (see step S5).

The physical route determination functional unit 22 then determines for the first and second routes, whether or not candidate routes remain even if each route (path) at which node overlapping occurs is deleted (see step S6).

If it is determined that two candidate routes do not remain, one or more combinations of two routes with the least amount of overlapping are selected and the operation proceeds to step S8.

In contrast, if relevant candidate routes remain, the physical route determination functional unit 22 deletes each route (or path) having the node overlapping for the first and second routes (see step S7).

Next, the physical route determination functional unit 22 refers to the information stored in the network information management unit 3 so as to compute candidate routes (that differ from the first and second routes) for the node pair of the start and end points of the third route by utilizing a k-shortest path algorithm (see step S8).

In this process, an operation utilizing the k-shortest path algorithm may be performed with an input value which is physical topology information in which links in the routes of each combination that has remained after the foregoing steps are deleted.

When there are a plurality of combinations of two remaining candidate routes, the third route is determined for each of the combinations through the following steps. In the combinations, the third route is determined in order from the smallest to the largest for the total number of hops of the two routes of each combination, or from the shortest to the longest for the total length of the relevant two routes.

The physical route determination functional unit 22 then determines for the third route and the first and second routes, whether or not a candidate for the third route remains even if each route (path) at which link overlapping for a fiber occurs is deleted (see step S9).

If it is determined that two candidate routes do not remain, one or more combinations with the least amount of overlapping are selected and the operation proceeds to step S15A.

When there is other combination(s) of two routes, the operation result of the present computation is temporarily stored in the operation result storage unit 4, and the processing from step S9 is again applied to the next combination. When no candidate route of the third route is present for all remaining combinations of two routes, the operation proceeds to step S15A. Such an operation is also performed in relevant determination processes described later.

In contrast, if there remains a candidate route for the third route in step S9, the physical route determination functional unit 22 deletes each route (or path) having the link overlapping for a fiber in the third route (see step S10).

The physical route determination functional unit 22 then determines for the third route and the first and second routes, whether or not a candidate for the third route remains even if each route (path) at which pipeline overlapping occurs is deleted (see step S11).

If it is determined that two candidate routes do not remain, one or more combinations with the least amount of overlapping are selected and the operation proceeds to step S15A.

In contrast, if there remains a candidate route for the third route, the physical route determination functional unit 22 deletes each route (or path) having the pipeline overlapping in the third route (see step S12).

The physical route determination functional unit 22 then determines for the third route and the first and second routes, whether or not a candidate for the third route remains even if each route (path) at which node overlapping occurs is deleted (see step S13).

If it is determined that two candidate routes do not remain, one or more combinations of three routes with the least amount of overlapping are selected and the operation proceeds to step S15A.

In contrast, if there remains a candidate route for the third route, the physical route determination functional unit 22 deletes each route (or path) having the node overlapping in the third route (see step S14).

After the relevant processing is applied to all combinations of two routes computed up to step S7, the physical route determination functional unit 22 computes the delay difference (i.e., difference in route length) between the individual pair of the first, second, and third routes of each remaining combination, which may be temporarily stored as described above, and the physical route determination functional unit 22 determines the routes whose combination of the delay difference values is smallest to be the selected first, second, and third routes (see step S15A).

The physical route determination functional unit 22 then stores the determined routes in the operation result storage unit 4.

As the delay difference, a difference in the number of nodes between the relevant routes may be computed. In addition, as the algorithm utilized in steps S1 and S8, the k-shortest path algorithm may be replaced with the all-routes search algorithm (e.g., breadth-first search algorithm).

As described above, in the route computation, the delay difference between the individual pair of the routes is computed and the routes whose combination of the delay difference values is smallest are selected. Therefore, a high-quality network having a small delay difference can be implemented.

The above explanation employs an example in which from among the extracted combinations of the redundant routes having a smallest size, one having the smallest number of nodes or the shortest route length is selected. However, the condition for the relevant selection is not limited thereto.

For example, a plurality of routes whose numbers of nodes or whose transmission distances (i.e., route lengths) are close to each other may be selected. In another example, a plurality of routes whose numbers of nodes or whose transmission distances are close to an average, a most frequent value, or a center value thereof may be selected.

Additionally, the following method in which the wavelength for wavelength allocation is changed to the route may be employed, a First-fit method (that selects, from among available routes, one having the smallest route number), a Most-used method (that selects a route which is used most), a Random-fit method (that randomly selects one of available routes), a Least-used method (that selects a route which is most rarely used), a PWA (Priority based Wavelength Assignment) method (that selects, from among available routes, one having a higher priority), or the like.

In addition, if the delay difference needs to be considered in advance, then in the two-routes selection performed prior to step S8 in the third to fifth embodiments, a condition pertaining to the delay difference may be employed so as to extract the relevant combination in the above-described constraint, or such a process may be performed in step S15.

As described above, network information, that includes the information about each path between start and end points, the physical topology, the information about start and end nodes for a plurality of routes, the fiber information of each link, and the pipeline overlapping information for fibers, is utilized to extract each combination of redundant routes in which a least number of routes have the fiber overlapping, the node loverlapping, or the pipeline overlapping. The redundant communication routes are thus designed by selecting from the extracted combinations, a combination having the small number of nodes or the shortest transmission distance.

Accordingly, it is possible to design a plurality of routes in which the pipeline overlapping can be avoided as much as possible and the overlapping of nodes and links can also be avoided as much as possible. Therefore, redundant communication routes which improve the reliability of the whole network can be designed.

In addition, it is possible to easily design redundant routes in which the start and end points of each redundant route belong to different sub-networks and any one of (i) the input points (to sub-network) of the redundant routes and (ii) the output points (from sub-network) of the redundant routes differ from each other.

In particular, in consideration of a case in which any one of (i) the input points (to sub-network) of the redundant routes and (ii) the output points (from sub-network) of the redundant routes has a state in which the relevant points differ from each other, the redundant routes in sub-networks can be designed.

Sixth Embodiment

Below, a path accommodation design apparatus according to a sixth embodiment of the present invention will be explained with reference to the drawings.

The present embodiment is effectively applied to a highly reliable design of redundant routes in a multilayer including sub-λ and wavelength paths. The configuration of the path accommodation design apparatus according to the sixth embodiment is equivalent to that shown in FIG. 1B and thus includes the operation rate computation functional unit 26. As described above, the operation rate computation functional unit 26 is a functional unit that computes an operation rate for a combination of a plurality of redundant routes by utilizing operation rates of nodes, fibers, links, and the like, which are stored in the network information management unit 3.

Figure 8:
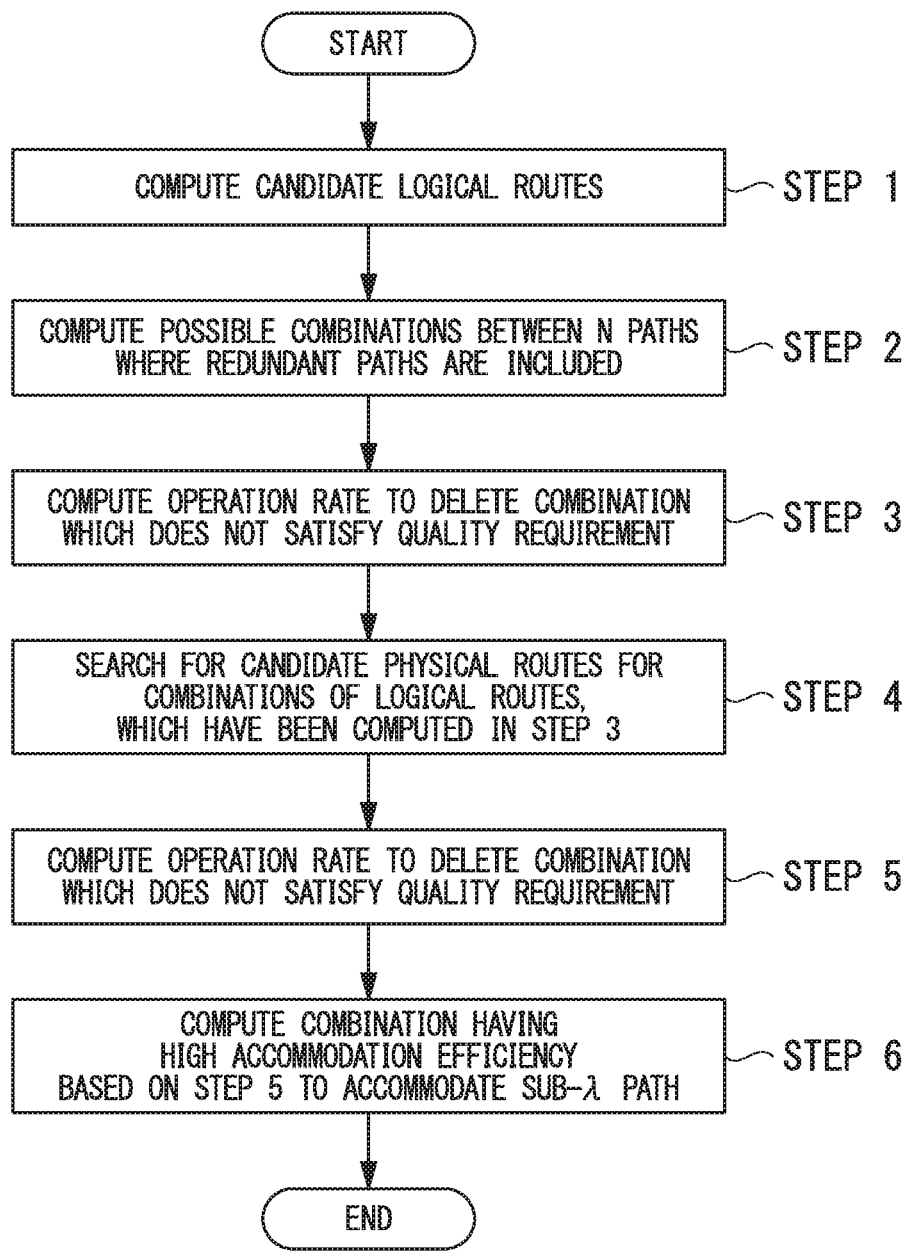
FIG. 8 is a flowchart that shows an operation performed by the path accommodation design apparatus of a sixth embodiment according to the present invention.

FIG. 8 is a flowchart showing the accommodation design operation for sub-λ and wavelength paths, which is executed by the relevant path accommodation design apparatus.

The sub-λ path setting request obtaining unit 1 obtains information that includes information items about:

(a) a pair of start and end nodes for each of redundant routes for which relevant setting has been requested; and
(b) as a quality requirement to be satisfied, information that includes (i) the operation rate or (ii) the number of nodes, the pipeline distance, and the number of links which are permitted to overlap, or information that includes both the above item (i) and the above item (ii).

Figure 9:
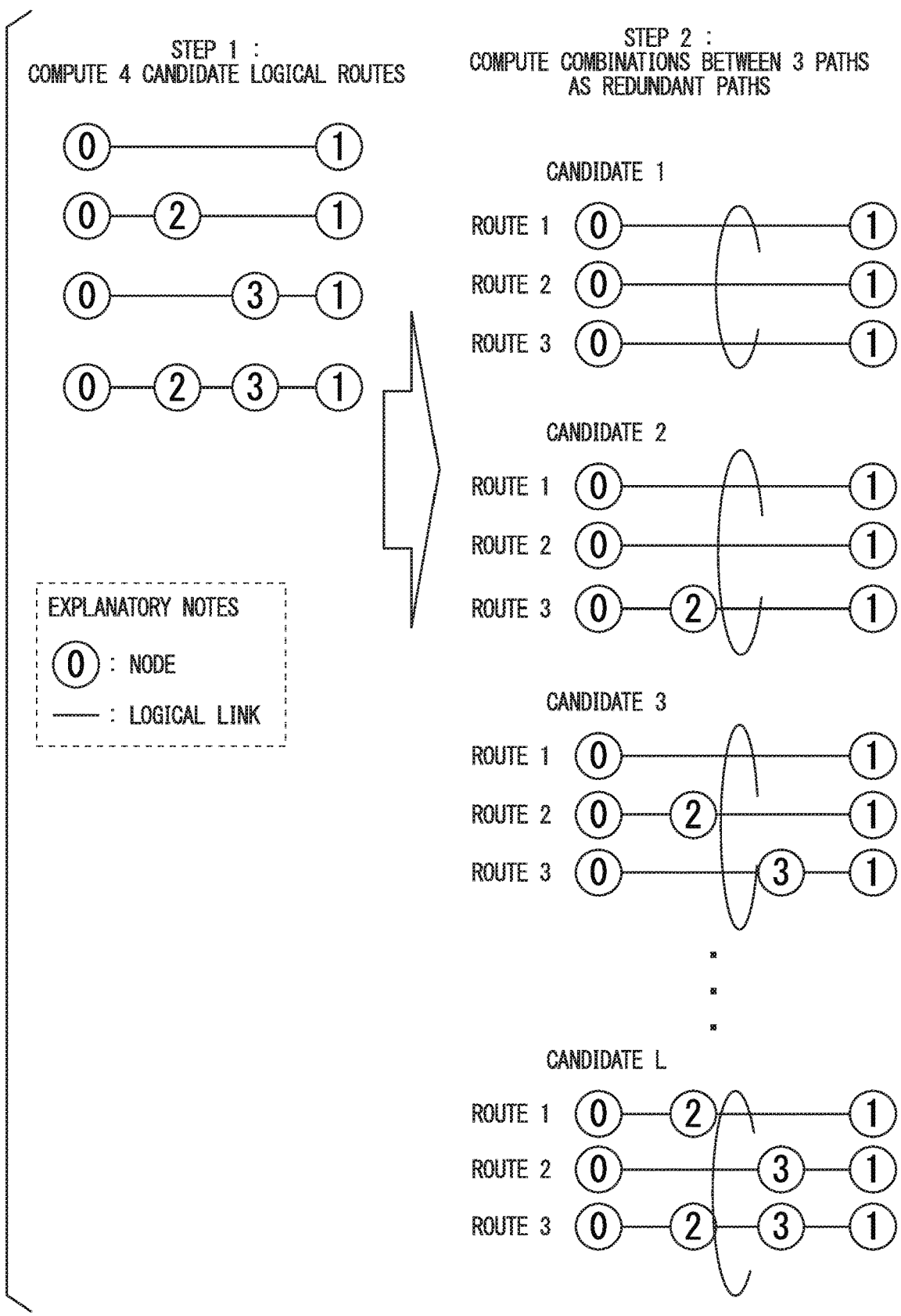
FIG. 9 is a diagram utilized to explain steps 1 and 2 in the flowchart of FIG. 8.

FIG. 8 shows the processing operation of the present embodiment, and the following explanation refers to FIG. 9.

First, the logical route determination functional unit 21 computes a plurality of candidate logical routes. FIG. 9 shows an example in which the number of the candidate routes is four (see step 1).

In the next step 2, possible combinations between N paths as redundant paths are computed. FIG. 9 shows an example of searching for such combinations between three paths where redundant paths are included.

In step 3, if an operation rate to be satisfied is provided in advance, the operation rate for the logical route is computed by the operation rate computation functional unit 26 so as to delete each combination which does not satisfy the relevant quality requirement. The method of computing the operation rate will be described in a last part of the present embodiment.

Instead of the above deletion method, each combination having node overlapping may be deleted. In the example of FIG. 9, since candidate L has overlapping at node 3, this candidate is cancelled. Here, step 3 may be omitted when the number of nodes or the number of redundant path routes is not large.

In the next step 4, for the combinations of logical routes, which have been computed up to step 3, candidate physical routes are computed by the physical route determination functional unit 22. In an example of the relevant computation method, after the candidate routes are computed utilizing a k-shortest path algorithm, combinations between them are computed. In this process, for each logical route (computed in step 3) that passes a relay node (i.e., for a multi-hop logical route), a route that does not pass the relevant relay node should be excluded from the candidate. For example, in FIG. 9, since "route 3" for "candidate 2" must pass "node 2" as a relay point, each route which does not pass "node 2" is excluded from the candidate. In another example, since each physical route (wavelength path) is set between terminal points which are a start node and a relay node (or relay nodes, or a relay node and an end node), the candidate routes may be computed between the relevant terminal points by utilizing a method described in the third to fifth embodiments.

Similar to step 3, in the next step 5, the operation rate is computed by the operation rate computation functional unit 26 so as to delete each combination which does not satisfy the relevant quality requirement if an operation rate to be satisfied is provided in advance. In another method, each combination in which the node overlapping, link overlapping, pipeline overlapping, or the like occurs is deleted.

Here, step 5 may be omitted when the number of nodes or the number of redundant path routes is not large.

In the next step 6, the physical route determination functional unit 22 computes a logical route that has a free band wider or equal to than the request bandwidth and thus has a high accommodation efficiency. Here, a combination having a high accommodation efficiency has a lower number of used wavelength paths, a lower number of wavelengths, and a lower number of used transponders.

The above computation can be performed by executing the above-described sub-λ path accommodation in a wavelength path (as shown in the first or second embodiment) in accommodation order equivalent to that of the sub-λ path accommodation. The accommodation order (i.e., priority order) will be shown below:

(1) accommodation in an existing wavelength path of a single-hop logical route;
(2) accommodation in an existing wavelength path of a multi-hop logical route;
(3) accommodation in a new wavelength path of a single-hop logical route; and
(4) accommodation in existing and new wavelength paths of a multi-hop logical route.

If there are a plurality of candidates for the same priority, a candidate having the smallest number of hops for the physical route is selected. If there are routes having the same number of hops for the physical route, one of the routes which has the smaller number of hops for the logical route is selected. Furthermore, if there are routes having the same number of hops for the logical route, the one which has a smaller wavelength use rate computed by the wavelength use rate computation functional unit 23 is selected.

In another example of the present logical design, a route having the smallest number of hops for the logical route is first selected, and if there are routes having the same number of hops for the logical route, the one which has a smaller number of hops for the physical route is selected.

If a new wavelength path is designed when the sub-λ path accommodation is performed in the above-described order, then the wavelength allocation determination functional unit 24 performs the wavelength path design by retrieving information about an available wavelength from among the information items stored in the network information management unit 3.

The design unit then determines whether or not it is possible to accommodate a wavelength path. If it is determined that the accommodation is possible, a sub-λ path is accommodated in the relevant wavelength path. Then the sub-λ path accommodation functional unit 25 updates relevant information by storing band information for the accommodation and information about the route and wavelength of the relevant wavelength path in the network information management unit 3. The sub-λ path accommodation functional unit 25 also stores information about the result of the path accommodation design in the operation result storage unit 4. The relevant operation is then terminated.

Operation Rate Computation Flow

Figure 10:
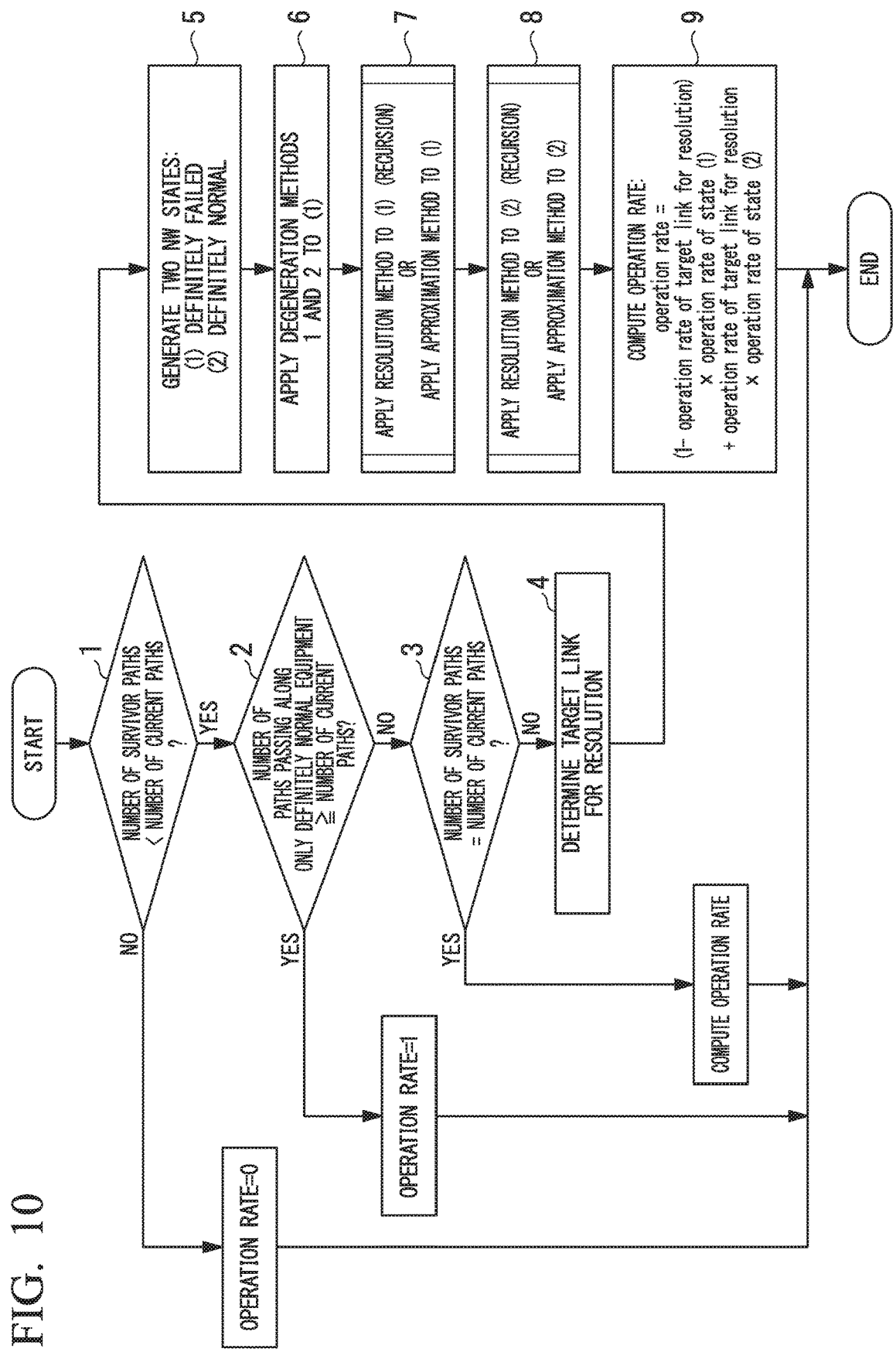
FIG. 10 is a flowchart that shows a method of computing an operation rate in the sixth embodiment.

FIG. 10 shows an example of the flowchart for the method of computing the above-described operation rate.

Prior to the entire flow of the flowchart in FIG. 10, a degeneration method, a resolution method, and an approximation method performed in the flowchart are explained with reference to FIGS. 11A to 13.

Figure 11A:
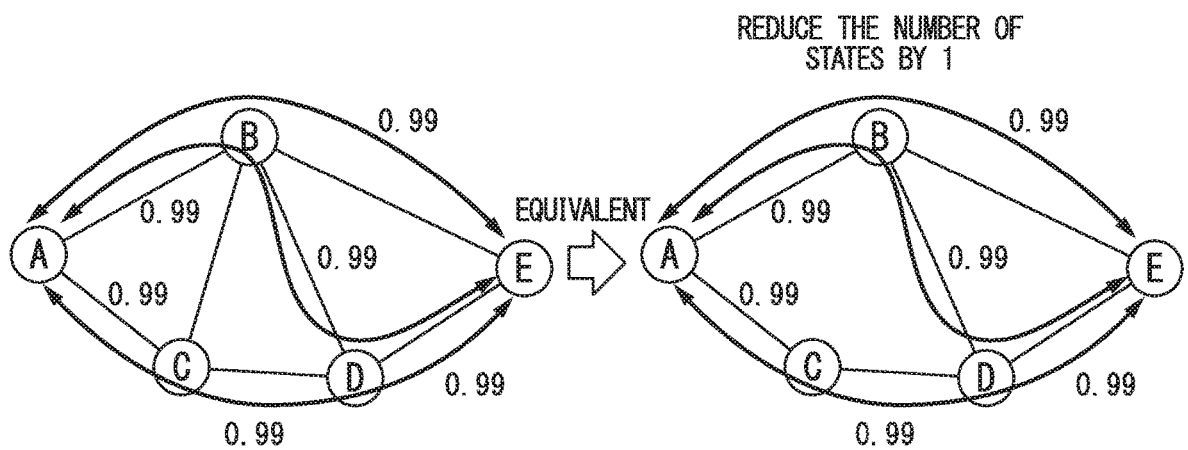
FIG. 11A is a diagram utilized to explain the degeneration method in the flowchart of FIG. 10.
Figure 11B:
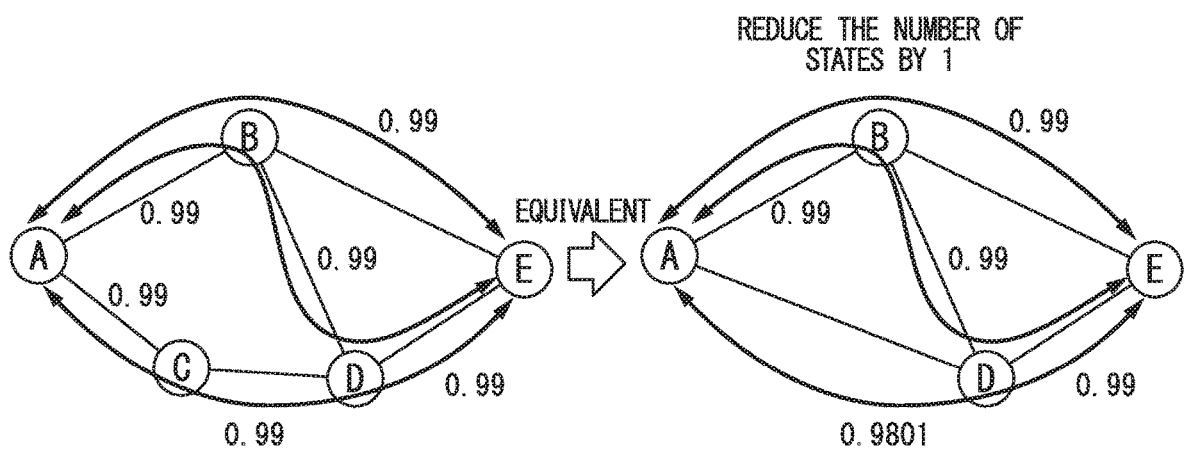
FIG. 11B is also a diagram utilized to explain the degeneration method in the flowchart of FIG. 10.

First, the degeneration method will be explained with reference to FIGS. 11A and 11B. As shown in these figures, if an operation rate (0.99) is assigned to each link and an operation rate for one current path and two standby paths between nodes A and E is computed, a link B-C along which no path passes can be disregarded because this link does not affect the operation rate computation (see "degeneration method 1" in FIG. 11A).

In addition, since a route A-C-D along paths A-C-D-E maintains a constant communication state after a fault occurs, the routes before and after the fault are regarded as the same element. In the shown example, a route element A-D is computed as "0.99×0.99=0.9801" (see "degeneration method 2" in FIG. 11B).

Figure 12:
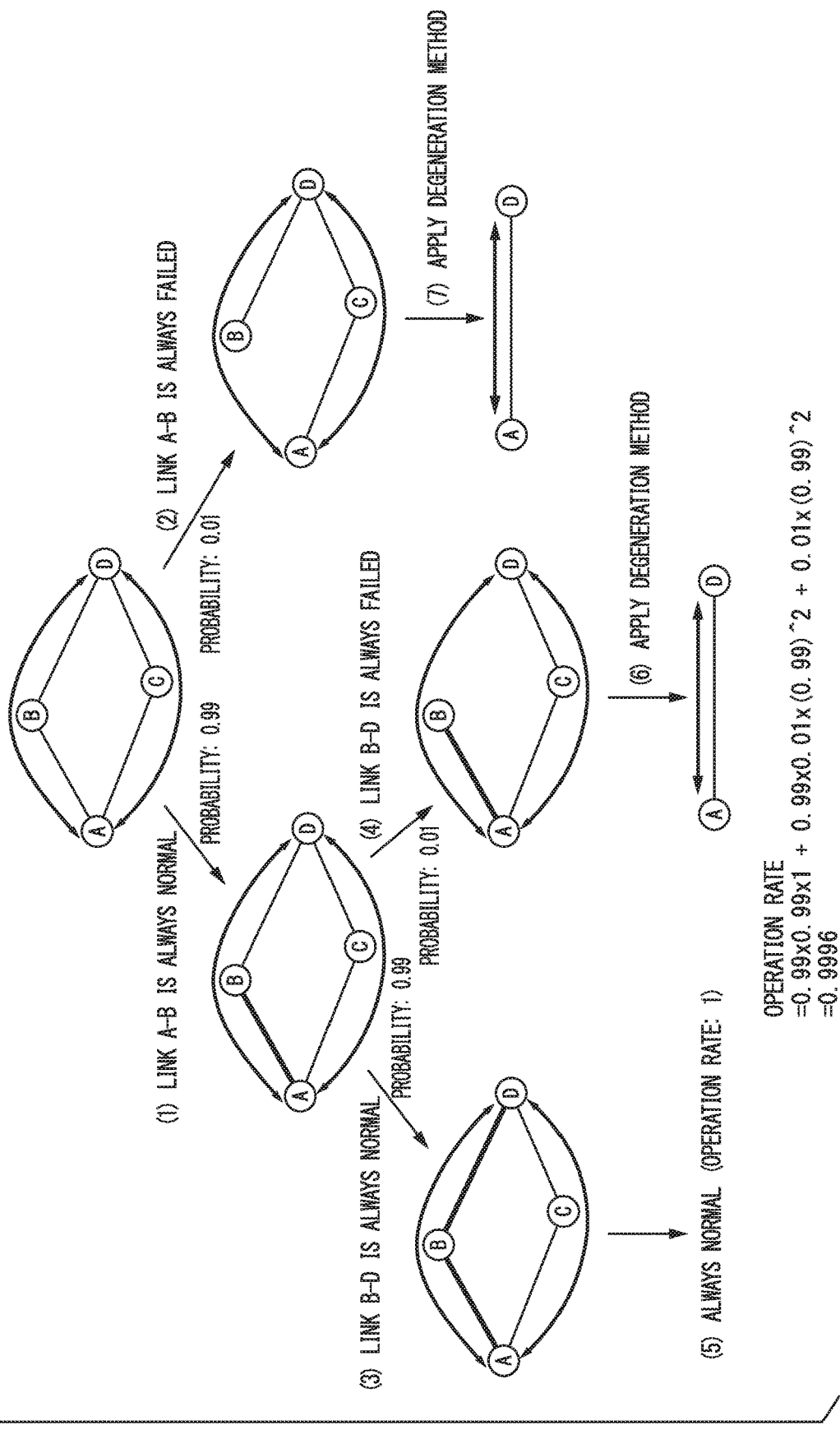
FIG. 12 is a diagram utilized to explain the resolution method in the flowchart of FIG. 10.

Next, the analysis method will be explained with reference to FIG. 12. The resolution method is a method to resolve a link (or a node or the like) into two assumed forms which correspond to "definitely normal (operation rate is 1)" and "definitely failed (operation rate is 0)" and are superimposed on each other, where the sum of reliability values for the individual forms is computed.

Here, a case having one current path and one standby path between nodes A and D is assumed. In the first step, a target link A-B is resolved into two forms corresponding to case (1) in which link A-B is normal and case (2) in which link A-B is failed. Similarly, the form for the above case (1) is further resolved into two forms corresponding to case (3) in which link B-D is normal and case (4) in which link B-D is failed. In the case (3), the normal state is always obtained and the operation rate therefor is computed as "0.99×0.99× 1".

In addition, when the form corresponding to the above case (4) is subjected to the degeneration method, an operation rate of "0.99×0.01×0.99^2" is obtained.

Furthermore, when the form corresponding to the above case (2) is subjected to the degeneration method, an operation rate of "0.01×0.99^2" is obtained.

The sum of the above-described operation rates is computed (as reliability) such that:

0.99×0.99×1+0.99×0.01×(0.99)^2+0.01× (0.99)^2=0.9996

Figure 13:
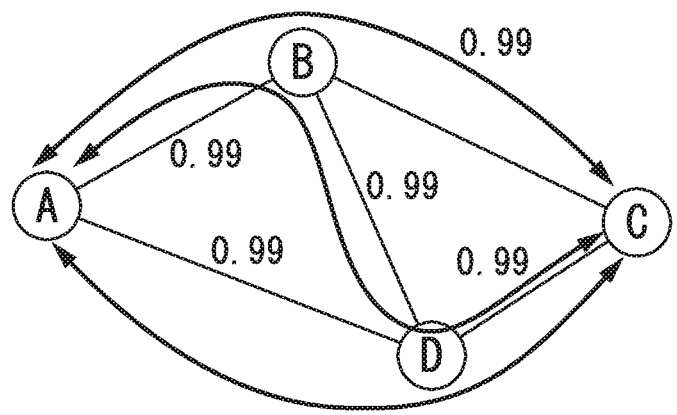
FIG. 13 is a diagram utilized to explain the approximation method in the flowchart of FIG. 10.

Lastly, the approximation method will be explained with reference to FIG. 13, by employing an example in which the operation rate is computed for redundant paths when one standby path is commonly assigned to two current paths.

First, connection propriety pertaining to each fault pattern for relevant links is represented utilizing a truth table. In the shown example, connection of pattern 4 is "NG" because a fault in link C-D causes disconnection of two paths. Similarly, connection of pattern 6 is NG because a fault in link A-B causes disconnection of two paths.

Accordingly, as a lower-limit of the operation rate, the operation rate for connectable patterns is computed. In the shown example, the lower-limit of the operation rate can be computed as follows:

0.99^5+(0.99^4*(1×0.99)*1)*3=0.979807     Lower limit:

Similarly, as an upper-limit of the operation rate, the operation rate for unconnectable patterns is computed. In the shown example, the upper-limit of the operation rate can be computed as follows:

1−(0.99^4*(1−0.99)*1)*2=0.980788     Upper limit:

Then an average of the upper and lower limit values is computed as an approximate solution:

(0.979807+0.980788)/2=0.9802975     Approximate solution:

The operation rate is computed by appropriately combining the above-described three computation methods (i.e., the degeneration method, the resolution method, and the approximation method). FIG. 10 shows an example of the computation which mainly utilizes the resolution method.

Step 1: It is determined whether or not the number of current paths is greater than the number of survivor paths.
If the determination result is "NO", the operation rate is set to 0 and the computation is terminated. Otherwise, the operation proceeds to step 2.

Step 2: It is determined whether or not the number of paths which pass along only "definitely normal" equipment is greater than or equal to the number of current paths.
If the determination result is "YES", the operation rate is set to 1 and the computation is terminated. Otherwise, the operation proceeds to step 3.

Step 3: It is determined whether or not the number of current paths is equal to the number of survivor paths.
If the determination result is "YES", the operation rate is computed, and otherwise, the operation proceeds to step 4.

Step 4: A target link (or node) for the resolution is selected.

Step 5: For the selected target link for the resolution, two states (or forms) of "(1) definitely failed" and "(2) definitely normal" are generated.

Step 6: The degeneration method (the above-described methods 1 and 2) is applied to the above state (1).

Step 7: The resolution method (for recursion) or the approximation method is applied to the state (1).

Step 8: According to the result of Step 7, the resolution method (for recursion) or the approximation method is applied to the above state (2).

Step 9: The operation rate is computed:

Operation rate=(1−operation rate of target link for resolution)×operation rate of state (1)+operation rate of target link for resolution×operation rate of state (2)

Here, the above approximation method is applied to a large-sized network (that may include 100 or more nodes) or a case having a large number of required redundant routes (5 or more routes).

Figure 14:
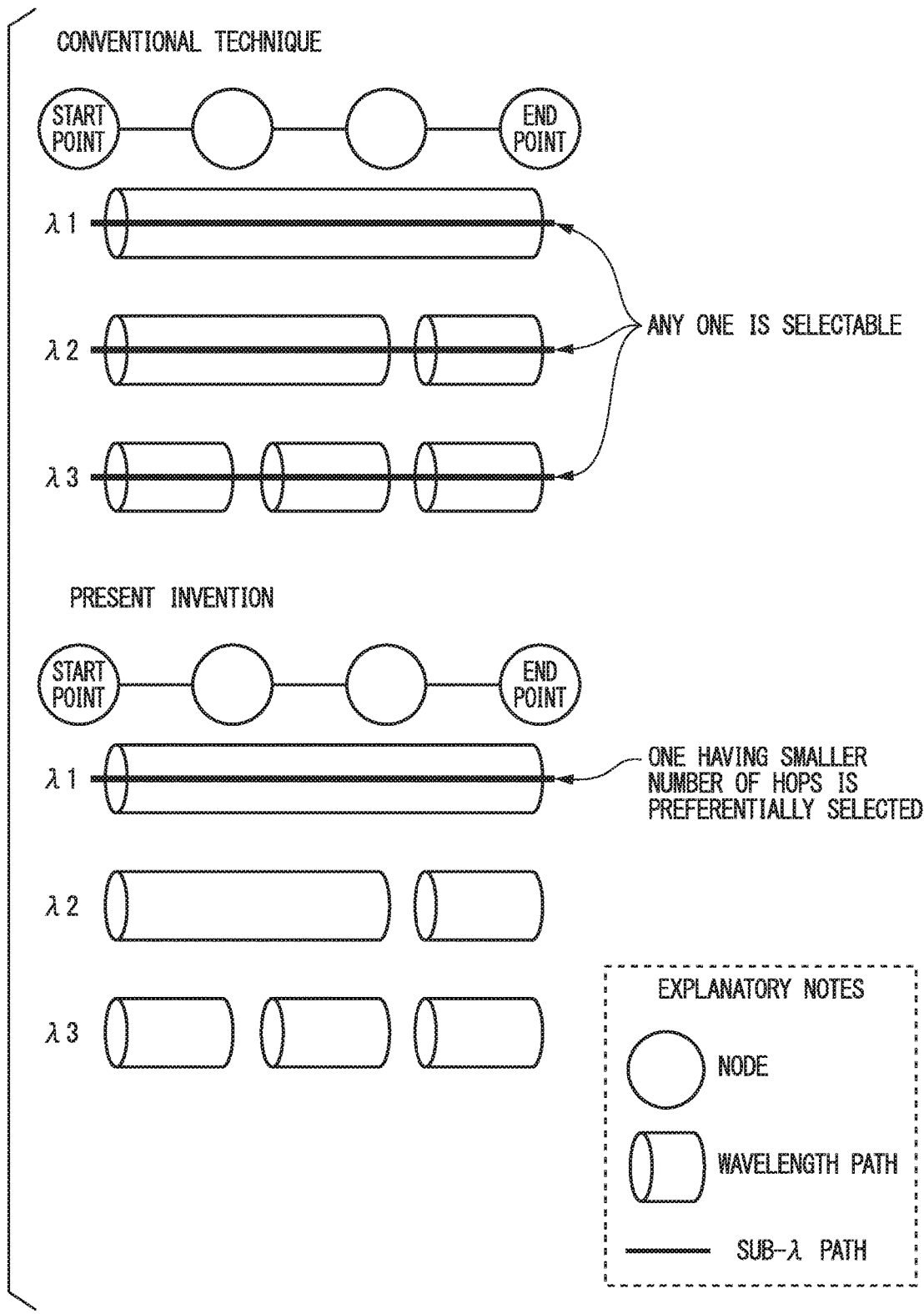
FIG. 14 is a diagram utilized to explain difference in function between a path accommodation design method according to the conventional technique and a path accommodation design method according to the present invention.
Figure 15:
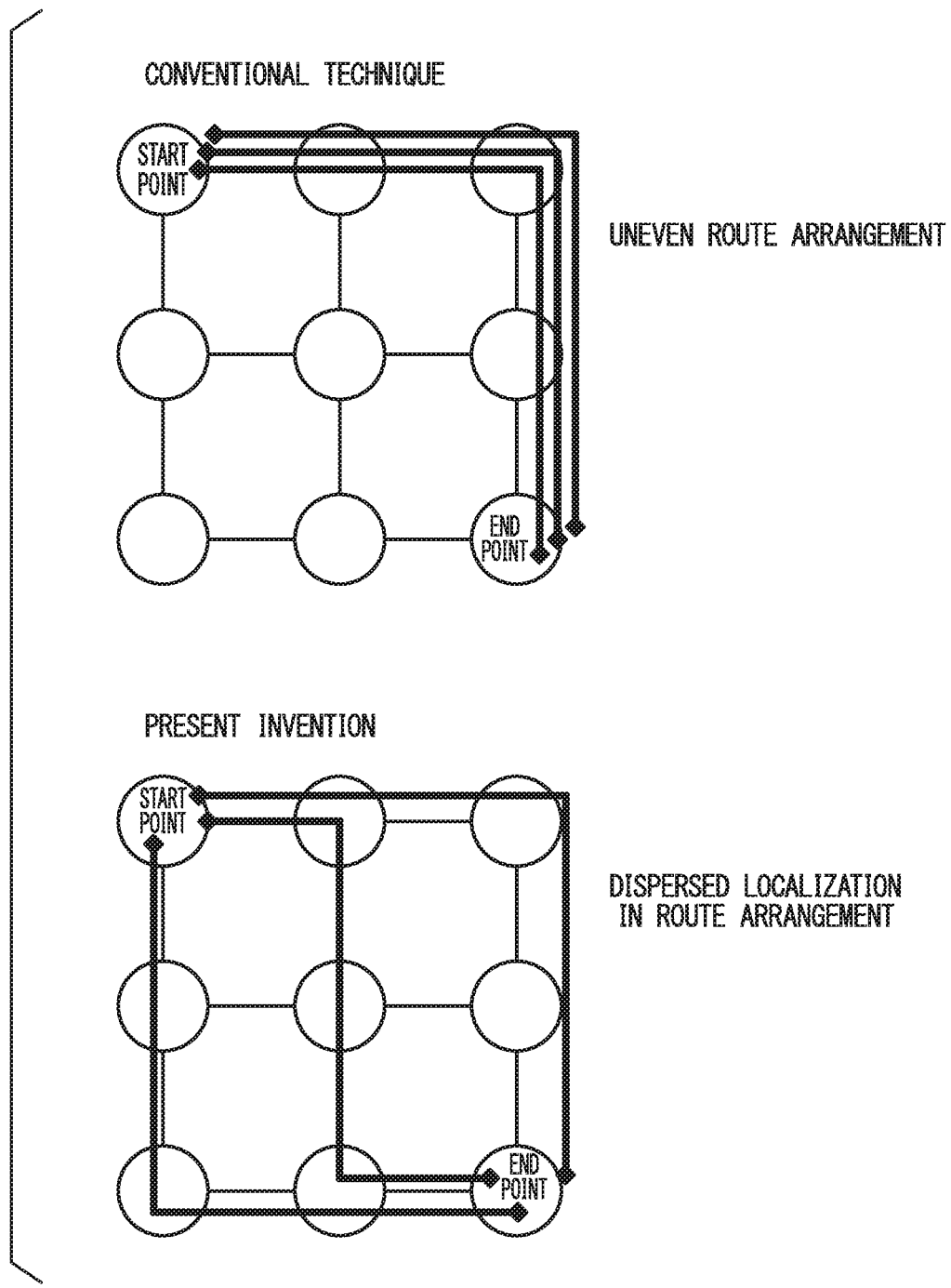
FIG. 15 is a diagram utilized to explain difference in function between a path accommodation design method according to the conventional technique and a path accommodation design method according to the present invention.
Figure 16:
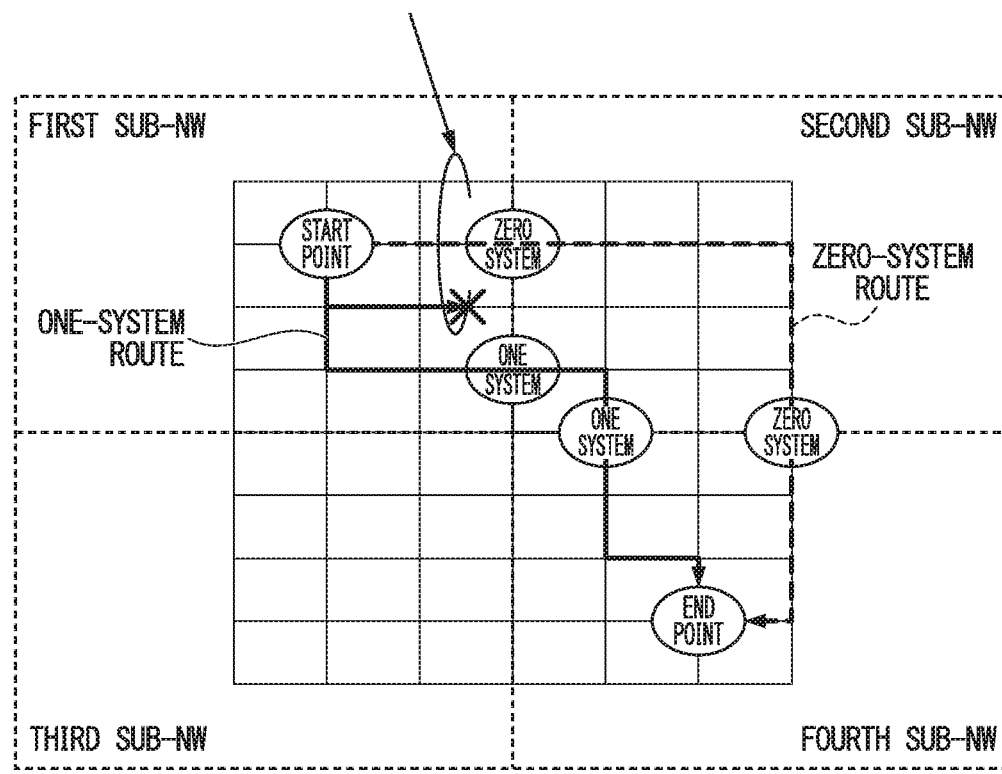
FIG. 16 is a diagram utilized to explain a route design process for a case in which the entire network is divided into four sub-networks (NWs).

Next, with reference to FIGS. 14 and 15, difference in function between a path accommodation design method according to the conventional technique and a path accommodation design method according to the present invention will be explained. FIGS. 14 and 15 are diagrams that each explain the difference in function between the path accommodation design methods of the conventional technique and the present invention.

As shown in FIG. 14, in the conventional technique, any one of wavelength paths can be selected and thus optimum path accommodation may not be implemented. In contrast, in the present invention, a wavelength path having a smallest number of logical hops is selected preferentially, which provides optimum path accommodation.

Additionally, as shown in FIG. 15, in the conventional technique, selected route arrangement may be uneven, and thus it is impossible to improve the path accommodation efficiency. In contrast, the present invention can produce dispersed route arrangement and thus can improve the path accommodation efficiency.

As explained above, a sub-λ path is selected by giving priority highest to lowest to the items of the number of hops for the wavelength path, the number of hops for the sub-λ path, the wavelength use rate, and the number of grooming nodes in this order, and for each item, a route having the smallest number is selected. That is, a route having a smallest number of hops for the logical route and a smallest number of hops for the physical routes is selected, where for the physical route, a route having a smallest wavelength use rate is further selected to design a target wavelength path. Accordingly, it is possible to design a wavelength path having no uneven route arrangement.

The present path accommodation method is a design method which combines a method of designing a (single-hop or multi-hop) logical route and a physical route selection method. In particular, in the logical route design method, if an existing wavelength path has a free band for target accommodation, the accommodation is performed in order from the smallest to the largest of the number of hops of the logical route. If no existing wavelength path utilized for the accommodation is present, a new wavelength path is designed in a single-hop or multi-hop manner.

Additionally, when a new wavelength path is designed, the wavelength use rate is computed so that each route has a relatively small wavelength use rate. Accordingly, uneven route arrangement can be prevented, and increase in relevant equipment can be more limited in comparison with the conventional technique.

In addition, network information, that includes the information about each path between start and end points, the physical topology, the information about start and end nodes for a plurality of routes, the fiber information of each link, and the pipeline overlapping information for fibers, is utilized to extract each combination of redundant routes in which a least number of routes have overlapping such as the fiber overlapping, the node loverlapping, or the pipeline overlapping. The redundant communication routes are designed by selecting from the extracted combinations, a combination having the small number of nodes or the shortest transmission distance.

Accordingly, it is possible to design a plurality of routes in which the pipeline overlapping can be avoided as much as possible and the overlapping of nodes and links can also be avoided as much as possible. Therefore, redundant communication routes which improve the reliability of the whole network can be designed.

In addition, it is possible to easily design redundant routes in which the start and end points of each redundant route belong to different sub-networks and any one of (i) the input points (to sub-network) of the redundant routes and (ii) the output points (from sub-network) of the redundant routes differ from each other. In particular, in consideration of a case in which any one of (i) the input points (to sub-network) of the redundant routes and (ii) the output points (from sub-network) of the redundant routes has a state in which the relevant points differ from each other, the redundant routes in sub-networks can be designed.

A program for executing the functions of the design unit 2 may be stored in a computer readable storage medium, and the program stored in the storage medium may be loaded and executed on a computer system, so as to perform the path accommodation design operation.

Here, the computer system has hardware resources which may include an OS and peripheral devices. The computer system also has a WWW system that provides a homepage service (or viewable) environment.

The above computer readable storage medium is a storage device, for example, a portable medium such as a flexible disk, a magneto optical disk, a ROM, or a CD-ROM, or a memory device such as a hard disk built in a computer system.

The computer readable storage medium also includes a device for temporarily storing the program, such as a volatile memory (RAM) in a computer system which functions as a server or client and receives the program via a network (e.g., the Internet) or a communication line (e.g., a telephone line).

The above program, stored in a memory device or the like of a computer system, may be transmitted via a transmission medium or by using transmitted waves passing through a transmission medium to another computer system.

The transmission medium for transmitting the program has a function of transmitting data, and is, for example, a (communication) network such as the Internet or a communication line such as (e.g., a telephone line).

In addition, the program may execute part of the above-explained functions. The program may also be a "differential" program so that the above-described functions can be executed by a combination of the differential program and an existing program which has already been stored in the relevant computer system.

While embodiments of the present invention have been described with reference to the drawings, it should be understood that these are exemplary embodiments of the invention and are not to be considered as limiting. Therefore, additions, omissions, substitutions, and other modifications can be made without departing from the technical concept and the scope of the present invention.

INDUSTRIAL APPLICABILITY

The present invention can be applied to a use to which accommodation design for the wavelength path and sub-λ path in a communication network is indispensable.

REFERENCE SYMBOLS 1 sub-λ path setting request obtaining unit
2 design unit
3 network information management unit
4 operation result storage unit

What is claimed is:
1. A path accommodation design apparatus that designs a plurality of redundant routes in a communication network, the apparatus comprising:
a communication network information storage device that stores communication network information which indicates configuration of a communication network;
a candidate route computation device that refers to the communication network information stored in the communication network information storage device and computes, based on information about start and end nodes of each of redundant routes whose setting is requested, physical routes as candidate routes for all or a number of communication routes, said number being designated in advance;

a communication route output device that outputs redundant communication route information which is information about the candidate routes where each candidate route having any one of fiber overlapping such that a single fiber is included in a plurality of routes, node overlapping such that a single node is included in a plurality of routes, and pipeline overlapping a single pipeline is included in a plurality of routes is deleted; and an operation rate computation device that computes an operation rate for a combination of the plurality of redundant routes, the operation rate being a percentage of an active operating time divided by a total operating time, wherein;

the candidate route computation device computes a first route by utilizing a computation method that computes the physical routes based on the operation rate, computed by the operation rate computation device, for at least one item of fiber, node, and pipeline;

the path accommodation design apparatus further comprises a device that computes a second route by utilizing the computation method after the first route is computed; and among a plurality of combinations of the first and second routes, any combination that exceeds an upper limit of the operation rate is deleted.

2. The path accommodation design apparatus of claim 1, wherein the active operating time is uptime for a combination of the plurality of redundant routes that is being used and the total operating time is the active operating time plus downtime for the combination of the plurality of redundant routes that is not being used.

* * * * *